United States Patent
Maclean et al.

(10) Patent No.: US 10,552,002 B1
(45) Date of Patent: Feb. 4, 2020

(54) USER INTERFACE BASED VARIABLE MACHINE MODELING

(71) Applicant: Palantir Technologies Inc., Palo Alto, CA (US)

(72) Inventors: Matthew Maclean, New York, NY (US); Benjamin Duffield, New York, NY (US); Mark Elliot, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/655,408

(22) Filed: Jul. 20, 2017

Related U.S. Application Data

(60) Provisional application No. 62/400,451, filed on Sep. 27, 2016.

(51) Int. Cl.
*G06F 3/0482* (2013.01)
*G06N 99/00* (2019.01)
*G06F 3/0481* (2013.01)
*G06N 20/00* (2019.01)

(52) U.S. Cl.
CPC ........ *G06F 3/0482* (2013.01); *G06F 3/04817* (2013.01); *G06N 20/00* (2019.01)

(58) Field of Classification Search
CPC . G06F 3/0482; G06F 3/04817; G06N 99/005; G06N 20/00
USPC .......................................................... 703/2
See application file for complete search history.

(56) References Cited

U.S. PATENT DOCUMENTS

| | | | |
|---|---|---|---|
| 5,515,488 A | 5/1996 | Hoppe et al. | |
| 6,324,532 B1 * | 11/2001 | Spence | G06K 9/3241 706/19 |
| 6,430,305 B1 | 8/2002 | Decker | |
| 6,820,135 B1 | 11/2004 | Dingman et al. | |

(Continued)

FOREIGN PATENT DOCUMENTS

| CN | 102546446 A | 7/2012 |
|---|---|---|
| CN | 103167093 A | 6/2013 |

(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.

(Continued)

*Primary Examiner* — Rehana Perveen
*Assistant Examiner* — Justin C Mikowski
(74) *Attorney, Agent, or Firm* — Schwegman Lundberg & Woessner, P.A.

(57) ABSTRACT

In various example embodiments, a comparative modeling system is configured to receive selections of a data set, a transform scheme, and one or more machine-learning algorithms. In response to a selection of the one or more machine-learning algorithms, the comparative modeling system determines parameters within the one or more machine-learning algorithms. The comparative modeling system generates a plurality of models for the one or more machine-learning algorithms, determines comparison metric values for the plurality of models, and causes presentation of the comparison metric values for the plurality of models.

14 Claims, 19 Drawing Sheets

(56) References Cited

U.S. PATENT DOCUMENTS

| | | |
|---|---|---|
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood et al. |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns et al. |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Rukonic et al. |
| 8,744,890 B1 | 6/2014 | Bernier et al. |
| 8,775,332 B1* | 7/2014 | Morris ............... G06N 99/005 706/11 |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,313,166 B1* | 4/2016 | Zeng ............... G06N 99/005 |
| 9,335,911 B1* | 5/2016 | Elliot ............... G06F 17/30572 |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga et al. |
| 2007/0162454 A1 | 7/2007 | D'Albora et al. |
| 2007/0185867 A1 | 8/2007 | Maga et al. |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0132953 A1 | 5/2009 | Reed, Jr. et al. |
| 2009/0157732 A1 | 6/2009 | Hao et al. |
| 2009/0187546 A1 | 7/2009 | Whyte |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042563 A1* | 2/2010 | Livingston ............ G06K 9/6226 706/12 |
| 2010/0042922 A1 | 2/2010 | Bradateanu et al. |
| 2010/0057622 A1 | 3/2010 | Faith |
| 2010/0070842 A1 | 3/2010 | Aymeloglu et al. |
| 2010/0098318 A1 | 4/2010 | Anderson |
| 2010/0106752 A1 | 4/2010 | Eckardt, III et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin et al. |
| 2011/0218955 A1 | 9/2011 | Tang et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo |
| 2012/0159362 A1 | 6/2012 | Brown et al. |
| 2012/0173381 A1 | 7/2012 | Smith |

(56) References Cited

U.S. PATENT DOCUMENTS

| | | |
|---|---|---|
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla et al. |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-yaniv et al. |
| 2013/0218879 A1 | 8/2013 | Park et al. |
| 2013/0226318 A1 | 8/2013 | Procyk et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0242761 A1* | 8/2015 | Amershi ............ G06K 9/00536 706/11 |
| 2015/0269933 A1* | 9/2015 | Yu .......................... G10L 15/16 704/232 |
| 2015/0338233 A1 | 11/2015 | Cervelli et al. |
| 2015/0379413 A1 | 12/2015 | Robertson et al. |
| 2015/0379429 A1* | 12/2015 | Lee ........................ G06N 20/00 706/11 |
| 2016/0004764 A1 | 1/2016 | Chakerian et al. |
| 2016/0018962 A1* | 1/2016 | Low ........................ G06F 8/34 715/771 |
| 2016/0180557 A1 | 6/2016 | Yousaf et al. |
| 2016/0277257 A1* | 9/2016 | Addleman .......... G06F 11/3466 |
| 2016/0358099 A1* | 12/2016 | Sturlaugson ........... G06N 20/00 |

FOREIGN PATENT DOCUMENTS

| | | |
|---|---|---|
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| EP | 2996053 A1 | 3/2016 |
| EP | 3035214 A1 | 6/2016 |
| EP | 3038002 | 6/2016 |
| EP | 3040885 A1 * | 7/2016 |
| WO | WO-2005116851 A2 | 12/2005 |
| WO | WO-2012061162 | 5/2012 |

OTHER PUBLICATIONS

"About OWA", Open Web Analytics, [Online]. Retrieved from the Internet: <URL: http://www.openwebanalytics.com/?page_jd=2>, (Accessed: Jul. 19, 2013), 5 pgs.

"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Final Office Action dated Apr. 14, 2016", 28 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, Examiner Interview Summary dated Jan. 4, 2016", 3 pgs.

"U.S. Appl. No. 14/225,084, Final Office Action dated Feb. 26, 2016", 14 pgs.

"U.S. Appl. No. 14/225,084, First Action Interview Pre-Interview Communication dated Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

"U.S. Appl. No. 14/225,160, Advisory Action dated May 20, 2015", 7 pgs.

"U.S. Appl. No. 14/225,160, Examiner Interview Summary dated Apr. 22, 2016", 7 pgs.

"U.S. Appl. No. 14/225,160, Final Office Action dated Jan. 25, 2016", 25 pgs.

"U.S. Appl. No. 14/225,160, Final Office Action dated Feb. 11, 2015", 30 pgs.

(56) References Cited

OTHER PUBLICATIONS

"U.S. Appl. No. 14/225,160, First Action Interview Pre-Interview Communication dated Jul. 29, 2014", 19 pgs.
"U.S. Appl. No. 14/225,160, First Action Interview Pre-Interview Communication dated Oct. 22, 2014", 6 pgs.
"U.S. Appl. No. 14/225,160, Non Final Office Action dated Jun. 16, 2016", 14 pgs.
"U.S. Appl. No. 14/225,160, Non Final Office Action dated Aug. 12, 2015", 23 pgs.
"U.S. Appl. No. 14/306,138, Advisory Action dated Dec. 24, 2015", 4 pgs.
"U.S. Appl. No. 14/306,138, Examiner Interview Summary dated Dec. 3, 2015", 3 pgs.
"U.S. Appl. No. 14/306,147, Final Office Action dated Dec. 24, 2015", 22 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/319,765, Non Final Office Action dated Feb. 1, 2016", 10 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/483,527, Notice of Allowance dated Apr. 29, 2016", 34 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.
"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview—Pre-Interview Communication dated Dec. 10, 2015", 6 pgs.
"U.S. Appl. No. 14/813,749, Final Office Action dated Apr. 8, 2016", 80 pgs.
"U.S. Appl. No. 14/813,749, Non Final Office Action dated Sep. 28, 2015", 22 pgs.
"U.S. Appl. No. 14/842,734, First Action Interview Pre-Interview Communication dated Nov. 19, 2015", 17 pgs.
"U.S. Appl. No. 14/858,647, Notice of Allowance dated Mar. 4, 2016", 47 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"Beta Testing On The Fly", TestFlight, [Online]. Retrieved from the Internet: <URL: https://testflightapp.com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"DISTIMO—App Analytics", [Online]. Retrieved from the Internet: <URL: http://www.distimo.com/app-analytics, (accessed Jul. 18, 2013), 5 pgs.
"European Application Serial No. 14187996.5, Communication Pursuant to Article 94(3) EPC dated Feb. 19, 2016", 9 pgs.
"European Application Serial No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 14202919.5, Office Action dated May 9, 2016", 13 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"European Application Serial No. 15200073.3, Extended European Search Report dated Mar. 30, 2016", 16 pgs.
"European Application Serial No. 15201924.6, Extended European Search Report dated Apr. 25, 2016", 8 pgs.
"European Application Serial No. 16152984.7, Extended European Search Report dated Mar. 24, 2016", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/ analytics/index.html, (accessed Jul. 18, 2013), 22 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404489.5, Office Action dated Oct. 6, 2014", 1 pg.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.

(56) References Cited

OTHER PUBLICATIONS

"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"Mobile Web", Wikipedia: [Online] retrieved from the internet:https://en.wikipedia.org/w/index.php?title=Mobile Web&oldid=643800164, (Jan. 23, 2015), 6 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www.kontagent.com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, Accessed: May 18, 2015, (Jul. 31, 2013), 1 pg.
"SAP BusinessObjects Explorer Online Help", SAP BusinessObjects, (Mar. 19, 2012), 68 pgs.
"Smart Thinking for Super Apps", [Online]. Retrieved from the Internet: <http://www.appacts.com>, (Jul. 18, 2013), 4 pgs.

"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.
"Welcome to StatCounter—Visitor Analysis for Your Website", StatCounter—Free Invisible Web Tracker, Hit Counter and Web Stats, [Online]. Retrieved from the Internet: <URL: http://statcounter.com/>, (Accessed: Jul. 19, 2013), 17 pgs.
Andrew, G. Psaltis, "Streaming Data—Designing the real-time pipeline", vol. MEAP V03, (Jan. 16, 2015), 12 pgs.
Apsalar, "Data Powered Mobile Advertising", Free Mobile App Analytics and various analytics related screen shots, (Jul. 18, 2013), 8 pgs.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, Constrained Clustering: Advances in Algorithms, Theory, and Applications 4.1, (2003), 9 pgs.
Gill, Leicester, et al., "Computerised linking of medical records: methodological guidelines", Journal of Epidemiology and Community Health 1993; 47, (Feb. 1993), 316-319.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, pp. 143-164,, (Sep. 2010), 53-67; 143-164.
Hua, Yu, et al., "A Multi-attribute Data Structure with Parallel Bloom Filters for Network Services", HiPC 2006, LNCS 4297, (2006), 277-288.
Janssen, Jan-Keno, "Wo bist'n du?—Googles Geodienst Latitude", Not in English, [Online] retrieved from the internet:http://www.heise.de/artikel-archiv/d/2011/03/086/@00250©/ct.11.03.086-088.pdf, (Jan. 17, 2011), 86-88.
Manno, et al., "Introducing Collaboration in Single-user Applications through the Centralized Control Architecture", (2010), 10 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Windley, J Phillip, "The Live Web: Building Event-Based Connections in the Cloud", Course Technology PTR Chapters 1, 2, and 10, (Dec. 21, 2011), 61 pgs.
Winkler, William E, et al., "Bureau of the Census Statistical Research Division Record Linkage Software and Methods for Merging Administrative Lists", Statistical Research Report Series, No. RR2001/03, (Jul. 23, 2001), 11 pgs.

* cited by examiner

USER INTERFACE BASED VARIABLE MACHINE MODELING

PRIORITY APPLICATION

This application claims priority to U.S. Provisional Application Ser. No. 62/400,451, filed Sep. 27, 2016, the disclosure of which is incorporated herein in its entirety by reference.

TECHNICAL FIELD

The subject matter disclosed herein generally relates to machines configured to the technical field of special-purpose machines that facilitate machine-learning based modeling including computerized variants of such special-purpose machines and improvements to such variants, and to the technologies by which such special-purpose machines become improved compared to other special-purpose machines that facilitate machine-learning based modeling. Embodiments of the present disclosure relate generally to machine-learning based modeling and, more particularly, but not by way of limitation, to a method of generating a user interface enabling simultaneous modeling of data sets using and comparing variable machine-learning techniques.

BACKGROUND

Machine-learning processes are often useful in making predictions based on data sets. Users may want to explore a large data set using multiple variables in distinct models. Typically, in order to generate multiple distinct models on a single data set, the individual generates each model separately inputting variable changes for each distinct model. Further, in order to generate models from differing machine-learning techniques, users often need expertise in each machine-learning technique and use differing interfaces for each machine-learning technique.

BRIEF DESCRIPTION OF THE DRAWINGS

Various ones of the appended drawings merely illustrate example embodiments of the present disclosure and cannot be considered as limiting its scope.

Figure 1:
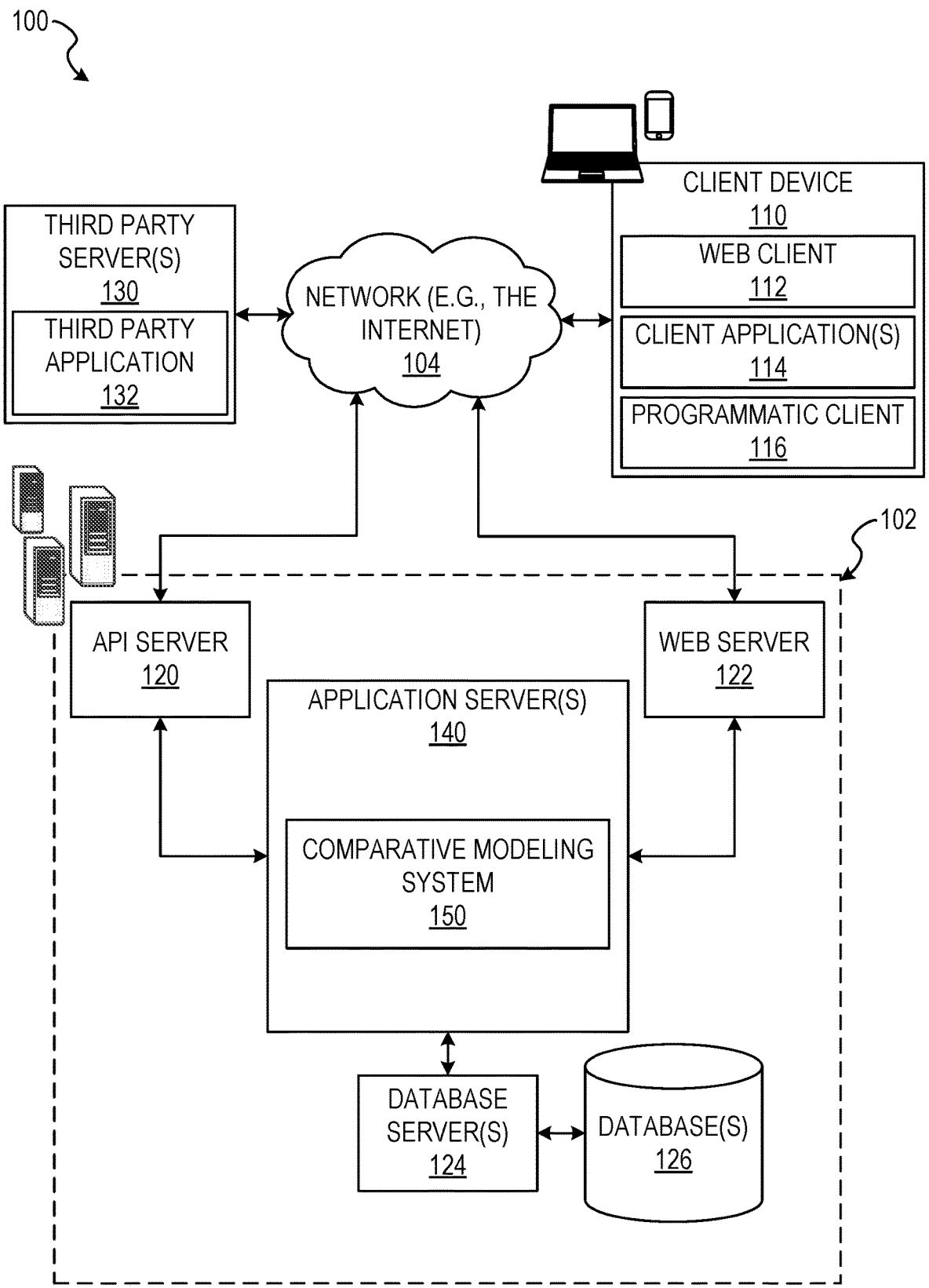
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example embodiments described herein disclose a comparative modeling system for performing modeling work. The comparative modeling system enables a user to utilize or view a consolidated set of steps to model, analyze, featurize, and vectorize data. The comparative modeling system also facilitates selection of models, iterative generation of models using selected data sets, comparison of models from multiple selected machine-learning or modeling algorithms, and tracking of input and results.

As an example, a user has a set of data and a thesis for machine-learning some portion of information from the set of data. The user wants to interact with multiple machine-learning models to identify a suitable or comparatively better machine-learning model or explore a new machine-learning model. The user establishes a machine-learning model to run on the set of data and to iteratively run on future data as the data is integrated into the set of data. The user takes guesses, adjusts model parameters, or, through selections in an interface, causes the comparative modeling system to automatically step through iterative modeling of the set of data using defined intervals. The settings for machine-learning models, in the comparative modeling system, may be hypo-parameters. User interface selections may enable the user to tune vectorization or featurization, or to iteratively try multiple options, automatically identifying suitable modeling results. For example, the user may model customer churn within a set of data to predict how many customers for a company will end a service given call logs, payment history, and other customer information. The comparative modeling system enables iterative processing of the data to identify variables, which have increased weight on churn decisions, churn likelihood, or timing of customer churn.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

With reference to FIG. 1, an example embodiment of a high-level client-server-based network architecture 100 is shown. A networked system 102, in the example forms of a network-based recommendation system, provides server-side functionality via a network 104 (e.g., the Internet or wide area network (WAN)) to one or more client devices 110. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may comprise, but is not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 may include one or more applications (also referred to as "apps") such as, but not limited to, a web browser, messaging application, electronic mail (email) application, and the like. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems comprising a comparative modeling system 150, which may comprise one or more modules or applications and which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the networked system 102. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more functions that are supported by the relevant systems or servers of the networked system 102.

The comparative modeling system 150 provides functionality operable to iteratively model distinct variables within a data set or generate iterative models for a data set using a plurality of distinct models. The comparative modeling system 150 enables access and interaction with machine-learning or other modeling algorithms for users with little expertise or experience in using modeling functions or algorithms. Further, the comparative modeling system 150 enables introduction and use of new or additional machine-learning models. In these embodiments, the comparative modeling system 150 facilitates integration of new modeling algorithms into existing sets of algorithms. In some instances, the comparative modeling system 150 enables sharing or distribution of newly added models to facilitate dissemination and testing of modeling algorithms. In some embodiments, the comparative modeling system 150 may access sets of data (e.g., document corpora) stored in a structured format from the databases 126, the third party servers 130, the API server 120, the client device 110, and other sources. In some instances, the comparative modeling system 150 analyzes the set of data to determine relationships among discrete data points or data trends using one or more iteratively generated machine learned model.

Further, while the network architecture 100 shown in FIG. 1 employs a client-server architecture, the present inventive subject matter is of course not limited to such an architecture, and could equally well find application in a distributed, or peer-to-peer, architecture system, for example. The comparative modeling system 150 could also be implemented as standalone software programs, which do not necessarily have networking capabilities.

Figure 2:
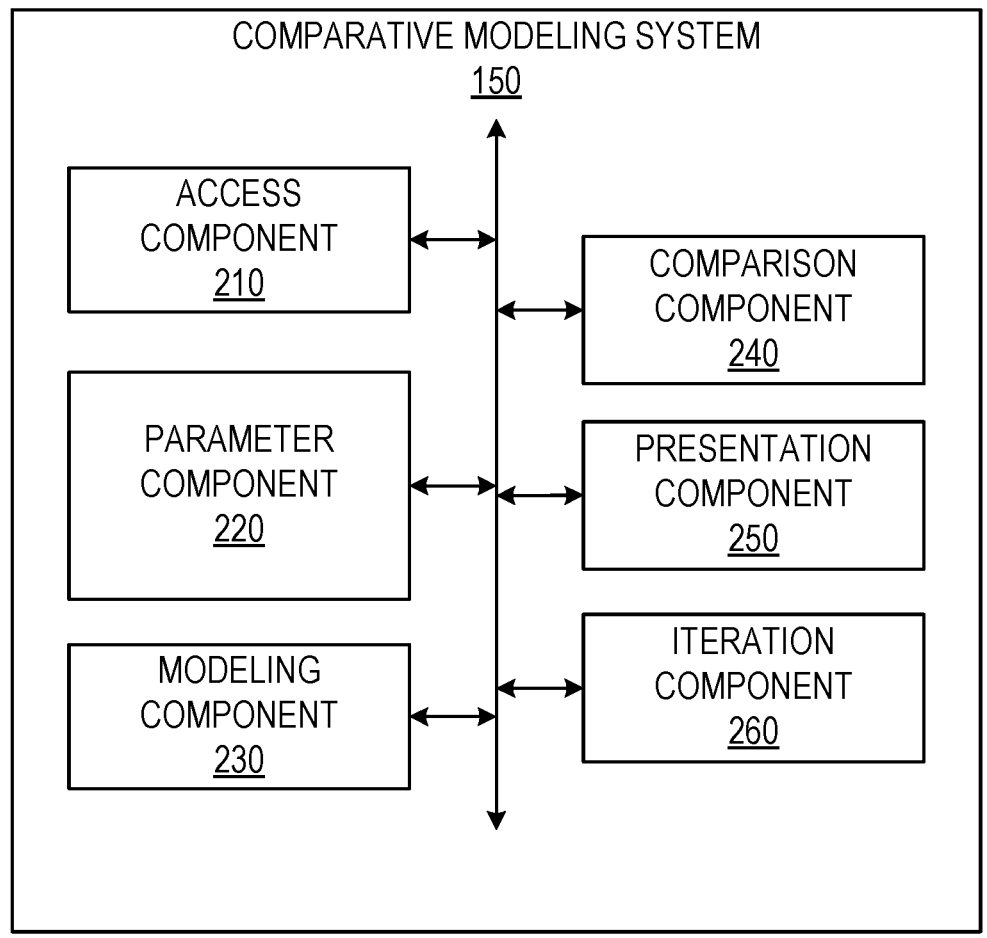
FIG. 2 is a block diagram illustrating various components of a comparative modeling system, according to various example embodiments.

FIG. 2 is a block diagram illustrating components of the comparative modeling system 150. Components of the comparative modeling system 150 configure the comparative modeling system 150 (e.g., one or more processors of a special-purpose machine) to access sets of data to be transformed for machine-learning analysis and modeling. In some embodiments, the components configure the comparative modeling system 150 to generate and transmit instructions causing a plurality of distributed client devices to identify sets of data, identify transform schemes, and perform one or more modeling operations on the set of data transformed by the transform scheme. In order to perform these operations, the comparative modeling system 150 comprises an access component 210, a parameter component 220, a modeling component 230, a comparison component 240, a presentation component 250, and an iteration component 260. Any one or more of these components may be implemented using one or more processors and hence may include one or more processors (e.g., by configuring such one or more processors to perform functions described for that component). During processing of the instructions, a component may convert computing components (e.g., the one or more processors and a processor-readable storage medium) of the comparative modeling system 150 into a special-purpose machine for performance of a set of operations.

The access component 210 receives selections of data sets, transform schemes, and machine-learning or modeling algorithms. The access component 210 may receive or access the selections through a graphical user interface generated by one or more components of the comparative modeling system 150. The access component 210 may also receive, retrieve, or otherwise access data within one or more databases to fulfill requests or provide input for one or more components of the comparative modeling system 150 in generating models. In some embodiments, the access component 210 accesses sets of data using a network connection (e.g., the Internet) to connect to a database containing the set of data to be modeled.

The parameter component 220 determines or otherwise identifies parameters selected within a graphical user interface generated and presented by one or more components of the comparative modeling system 150. In some instances, the parameter component 220 determines parameters selected for machine-learning algorithms. The parameter component 220 may pass selections of parameters to one or more other components of the comparative modeling system 150 for processing of the set of data and generating models using the set of data. The parameter component 220 may perform validation checks to determine if selected parameters are compatible for use with respect to other selected parameters, selected transform schemes, and selected machine-learning algorithms. In some instances, in response to one or more selections (e.g., selection of a set of data and selection of a transform scheme), the parameter component 220 operates in cooperation with one or more of the access component 210 and the presentation component 250 to generate and present parameter selections within the graphical user interface.

The modeling component 230 generates models from selected sets of data modified by a selected transform scheme. The modeling component 230 generates one or more models based on one or more selected machine-learning algorithms. In some instances, the modeling component 230 generates a single model, an iterative model, or a plurality of models for a single set of data with respect to a single machine-learning algorithm. In some embodiments, the iterative model comprises a set of models, where each model is generated for a selected number of steps or other plurality of specified values for a selected machine-learning algorithm. The modeling component 230 may also generate one or more models for a single data set with respect to a plurality of selected machine-learning algorithms.

The comparison component 240 determines one or more comparison metric values for a plurality of models generated for a selected set of data. The comparison component 240 may determine the comparison metric values based on selections received from the graphical user interface or may automatically determine comparison metric values based on one or more of the selected set of data, the selected transform scheme, or the one or more selected machine-learning algorithms.

The presentation component 250 causes presentation of the comparison metric values for the plurality of models generated using the one or more selected machine-learning algorithms. The presentation component 250 also generates and causes presentation of a graphical user interface configured to pass selections for sets of data, transform schemes, and machine-learning algorithms to the access component 210. In some instances, the presentation component 250 dynamically generates, regenerates, or modifies the graphical user interface based on selections received at a client device or through a user input device. The presentation component 250 may dynamically generate or modify the graphical user interface in response to changes to the set of data (e.g., data being updated or new data being added), a set of transform schemes (e.g., new transform schemes being added), and a set of machine-learning algorithms (e.g., machine-learning algorithms being added, removed, modified, or generating models).

The iteration component 260 determines iteration orders for parameters within a selected machine-learning algorithm. In some instances, the iteration component 260 determines a plurality of iteration orders based on parameters of a plurality of algorithms. In determining iteration orders, the iteration component 260 may determine upper bounds, lower bounds, and iteration intervals (e.g., steps) by which to modify parameters between the upper and lower bounds. The iteration component 260 may cooperate with the modeling component 230 to iteratively generate models given parameter selections including iterative step values and ranges for one or more parameters.

Any one or more of the components described may be implemented using hardware alone (e.g., one or more of the processors of a machine) or a combination of hardware and software. For example, any component described in the comparative modeling system 150 may physically include an arrangement of one or more processors (e.g., a subset of or among the one or more processors of the machine) configured to perform the operations described herein for that component. As another example, any component of the comparative modeling system 150 may include software, hardware, or both, that configure an arrangement of one or more processors (e.g., among the one or more processors of the machine) to perform the operations described herein for that component. Accordingly, different components of the comparative modeling system 150 may include and configure different arrangements of such processors or a single arrangement of such processors at different points in time. Moreover, any two or more components of the comparative modeling system 150 may be logically or physically combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
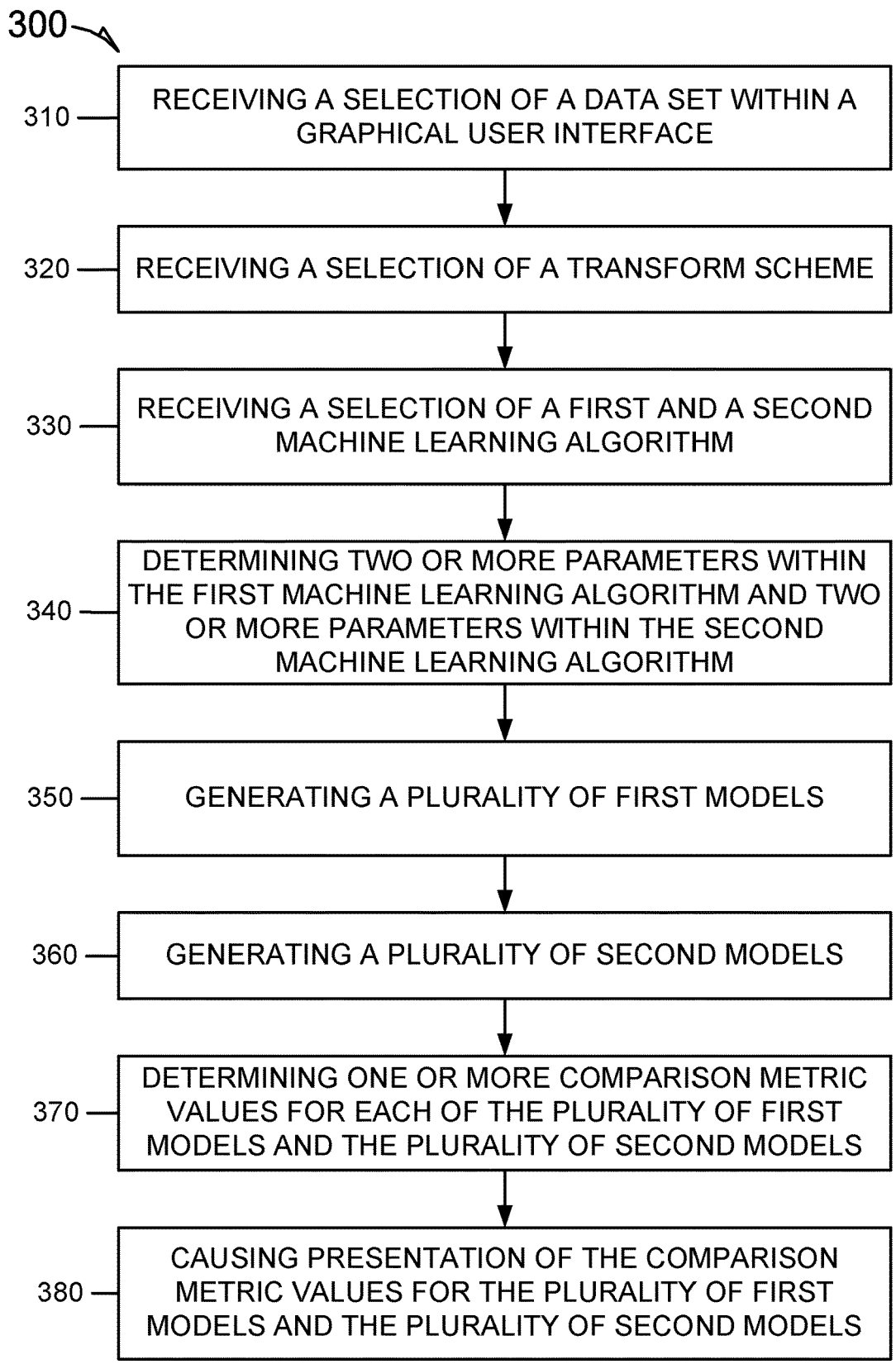
FIG. 3 is a flowchart illustrating individual operations of a method for generating a graphical user interface to comparatively model data sets using variable machine-learning techniques, according to some example embodiments.

FIG. 3 is a flowchart illustrating operations of the comparative modeling system 150 in performing a method 300 of generating a graphical user interface to comparatively model data sets using variable machine-learning techniques, according to some example embodiments. Operations of the method 300 may be performed by the modules described above with respect to FIG. 2.

Figure 4:
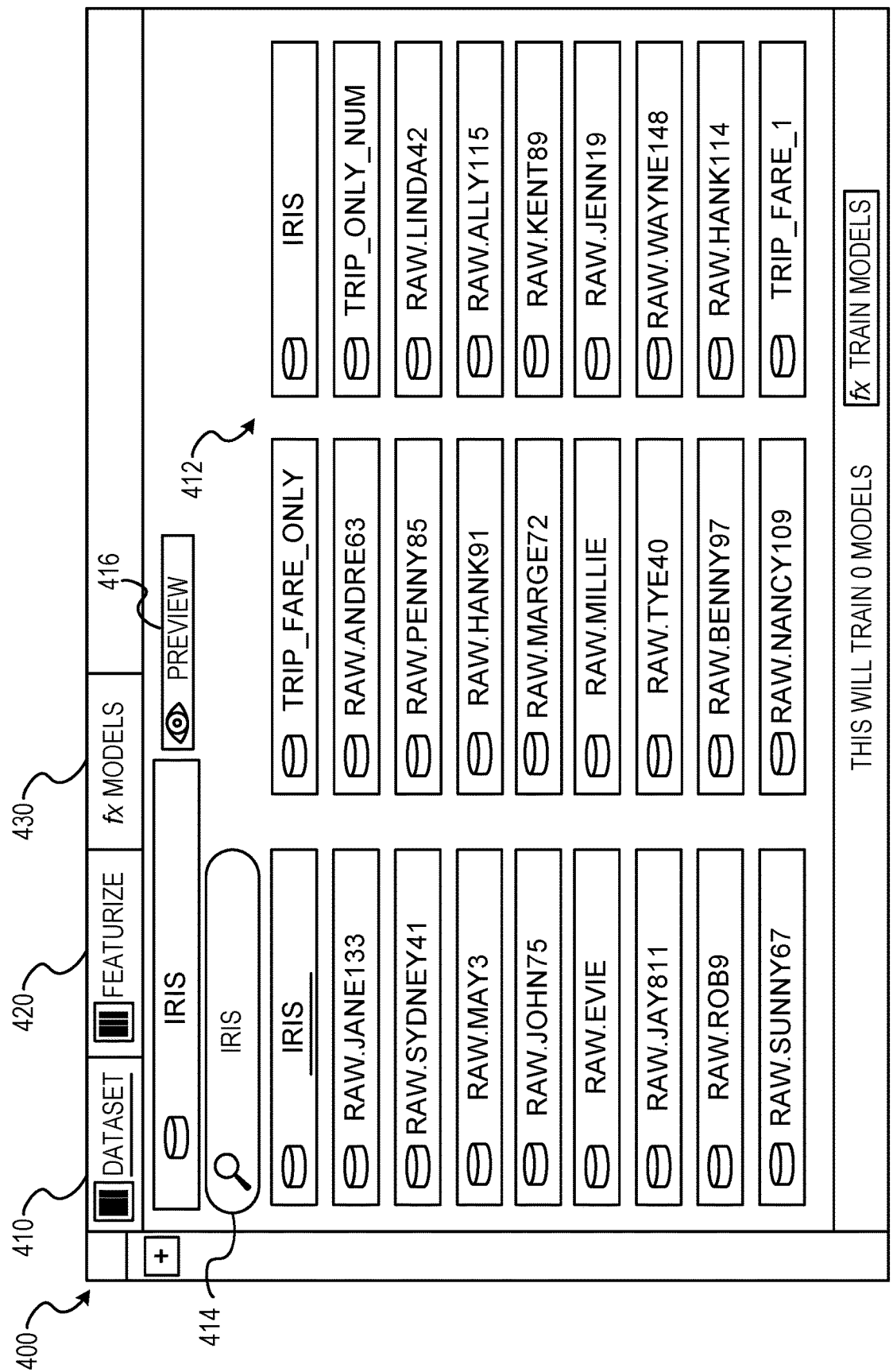
FIG. 4 is a graphical user interface comprising display elements for comparative modeling of data sets using variable machine-learning techniques, according to various example embodiments.

In operation 310, the access component 210 receives a selection of a data set within a graphical user interface displayed on a display device of a client device. The data set includes a set of values associated with a set of identifiers. The access component 210 receives selection of the data set through the graphical user interface 400, as shown in FIG. 4. For example, the access component 210 may receive the selection of the data set as a set of alphanumeric text, a selection of a radio button, a selection from a scroll menu, a selection from a drop down menu, or any other suitable user input.

In some instances, prior to receiving the selection of the data set, the presentation component 250 generates and causes presentation of a graphical user interface 400. The graphical user interface 400 includes a set of selectable categorical input elements 410-430. In some embodiments, each of the selectable categorical elements 410-430 represent a distinct input, the combination of which enables the comparative modeling system 150 to generate and compare models for specified data sets. As shown in FIG. 4, the selectable categorical elements 410-430 are divided into a data set input 410, a transform scheme input 420, and a model family input 430. The selection of a categorical element may cause the presentation component 250 to generate at least a portion of a graphical user interface including one or more graphical interface elements enabling selection, change, addition, removal, or other manipulation of a selection relating to a type of the selected categorical input element.

As shown in FIG. 4, the dataset input 410 represents data sets accessible by or included in the comparative modeling system 150. Selection of the data set input 410 may cause the presentation component to generate a set of data set elements 412. As shown, the set of data set elements 412 may include a text input field and one or more selectable interface elements. Each interface element of the set of data set elements 412 may represent a single data set or a set of data sets accessible by the comparative modeling system 150 for use in generating and comparing models.

As shown, in some embodiments, a first data set element 414 is a text field configured to receive alphanumeric text. The access component 210, receiving text input into the first data set element 414, accesses a database including one or more data sets associated with the text received from the first data set element 414. The access component 210 may cause the presentation component 250 to display selectable representations (e.g., graphical interface elements) of the one or more data sets associated with the text received from the first data set element 414.

Upon receiving selection of the data set, the presentation component 250 generates a preview element 416. The preview element 416 is a selectable graphical interface element presented within the graphical user interface 400. In some instances, the preview element 416 may be generated proximate to the data set input 410. However, it should be understood that the presentation component 250 may cause presentation of the preview element 416 at any suitable location within the graphical user interface 400. In some embodiments, the presentation component 250 generates the preview element 416 as a pop-up window obscuring a portion of the graphical user interface 400. Selection of the preview element causes the presentation component 250 to generate and present at least a portion of the data set selected in operation 310. In some instances, the preview is a formatted representation of the portion of the data set. The formatted representation may be based on raw data included in a database as all or part of the set of data, processed data according to a previously generated model, storage of the data into a specified format, or any other suitable representation.

Returning to FIG. 3, in operation 320, the access component 210 receives a selection of a transform scheme configured to transform one or more values of the data set from a first form to a second form. The access component 210 may receive selection of the transform scheme through the graphical use interface 400, as shown in FIG. 4. For example, the access component 210 may receive the selection of the transform scheme as a set of alphanumeric text, a selection of a radio button, a selection from a scroll menu, a selection from a drop down menu, or any other suitable user input.

The transform families may include one or more algorithms, processes, or operations to modify data within the selected data set. In some embodiments, the transform families modify the data to conform to a format, type, or configuration suitable for one or more models specified within the model family input 430. For example, as shown, the transform families may include a binarization transform, a drop column transform, and a vector assembler transform. The binarization transform may convert data within the selected data set to a binary representation. The drop column transform may remove a selected or predetermined column from data within the selected data set. Although specific transform families are described within the present disclosure, it should be understood that any suitable transform, process, algorithm, or set of operations may be included which is configured to modify data into a format suitable for modeling by one or more modeling operations or algorithms.

In some embodiments, selection of the transform scheme may be understood as featurization and be performed by one or more of the modeling component 230 and the iteration component 260. Featurization may be described as a process of converting data found within a set of data from a first form (e.g., raw data) to a second form (e.g., data able to be used by a model or vectorizer). The comparative modeling system 150 enables featurization of multiple different data sets. After featurization, the comparative modeling system 150 enables combination of the multiple different featurized data sets. The different featurized data sets may be combined with a label table. The final combined table may be processed using a vectorizer or remain in the featurized combined data table form and be provided to the modeling component 230 for generating models, as described in more detail below.

In some instances, a featurization process, technique, algorithm, or set of operations creates a numerical conversion of the data from the set of data. Featurization may process and convert the set of data for regression modeling using bigram analysis, singular value decomposition, cross validation, or any other suitable featurization method. In some embodiments, featurization may organize data without modifying the format of the data. In these cases, featurization may modify a data structure or set of data to be presented with respect to a specified featurized value or variable. The featurization process may also generate indicators or labels used to organize the data in the second form. Featurization of the set of data may introduce additional data in order to translate the set of data from the first form to the second form. In these embodiments, the additional data may incorporate discrete values representative of labels or non-numerical representations into the set of data. For example, if the set of data is provided in a data table incorporating textual information, such as a name, the additional data, included in the data table, may assign columns for each name and a value in each entry for each newly assigned column. Where the name specified in the column is associated with the entry, a first value may specify the association of the name and the entry (e.g., the name corresponds with the specified entry). Where the name specified in the column is not associated with the entry, a second value may indicate no association.

Figure 5:
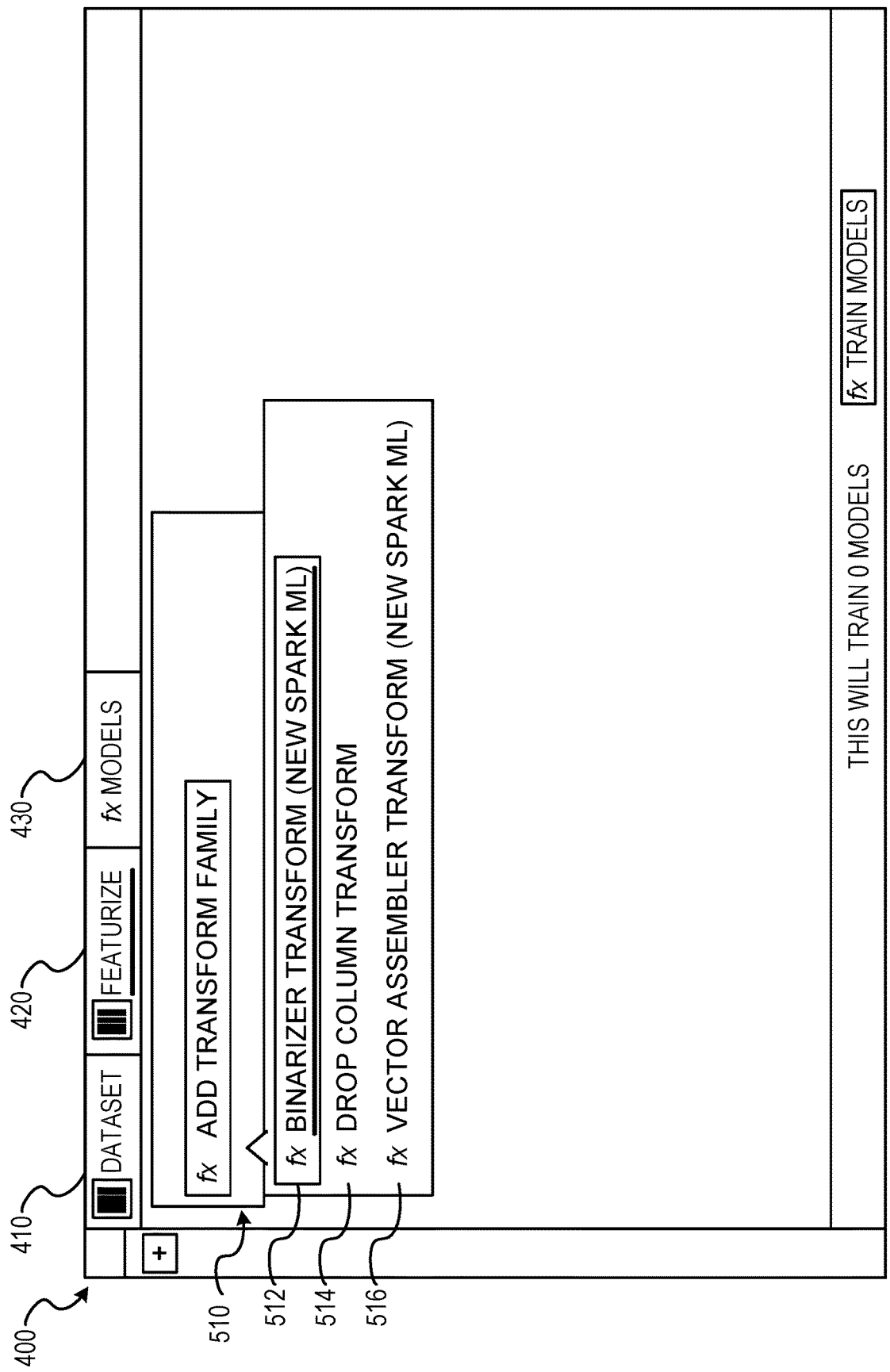
FIG. 5 is a graphical user interface comprising display elements for comparative modeling of data sets using variable machine-learning techniques, according to various example embodiments.

In some embodiments, the presentation component 250 generates and causes presentation of the graphical user interface 400, including the transform scheme input 420. As shown in FIG. 4, the transform scheme input 420 may be a selectable graphical interface element such as a tab. In some instances, selection of the transform scheme input 420 causes the presentation component 250 to generate and cause presentation of a transform element 510. The transform element 510 may be a representation of one or more transform families. As shown in FIG. 5, the transform element 510 may be a single transform element representative of the transformation families, which include the selected transform scheme input 420. Selection of the transform element 510 may cause the presentation component 250 to generate one or more transform family elements. As shown in FIG. 5, the one or more transform family elements are represented by family elements 512-516. For example, the family element 512 represents a binarizer transform, the family element 514 represents a drop column transform, and the family element 516 represents a vector assembler transform, as shown in FIG. 5. Each family element may represent a single transform family, algorithm, or set of operations configured to modify data within the selected set of data. Although described with respect to a single transform element, in some embodiments, the transform element 510 may be replaced by a plurality of family elements, such that selection of the transform scheme input 420 causes the presentation component 250 to automatically present the one or more transform families without initially presenting the transform element 510.

Returning to FIG. 3, in operation 330, the access component 210 receives selection of a first machine-learning algorithm and a second machine-learning algorithm. The access component 210 may receive the selections of the first and second machine-learning algorithms from an input device of the client machine where selectable graphical interface elements for a set of machine-learning algorithms, including the first and second machine-learning algorithms, are presented and made available for selection. The first machine-learning algorithm is configured to generate a first model for the set of values of the data set. The second machine-learning algorithm is configured to generate a second model for the set of values of the data set. Although described with respect to a first machine-learning algorithm and a second machine-learning algorithm, it should be understood that the access component 210 may receive selections of any number of machine-learning algorithms.

Figure 6:
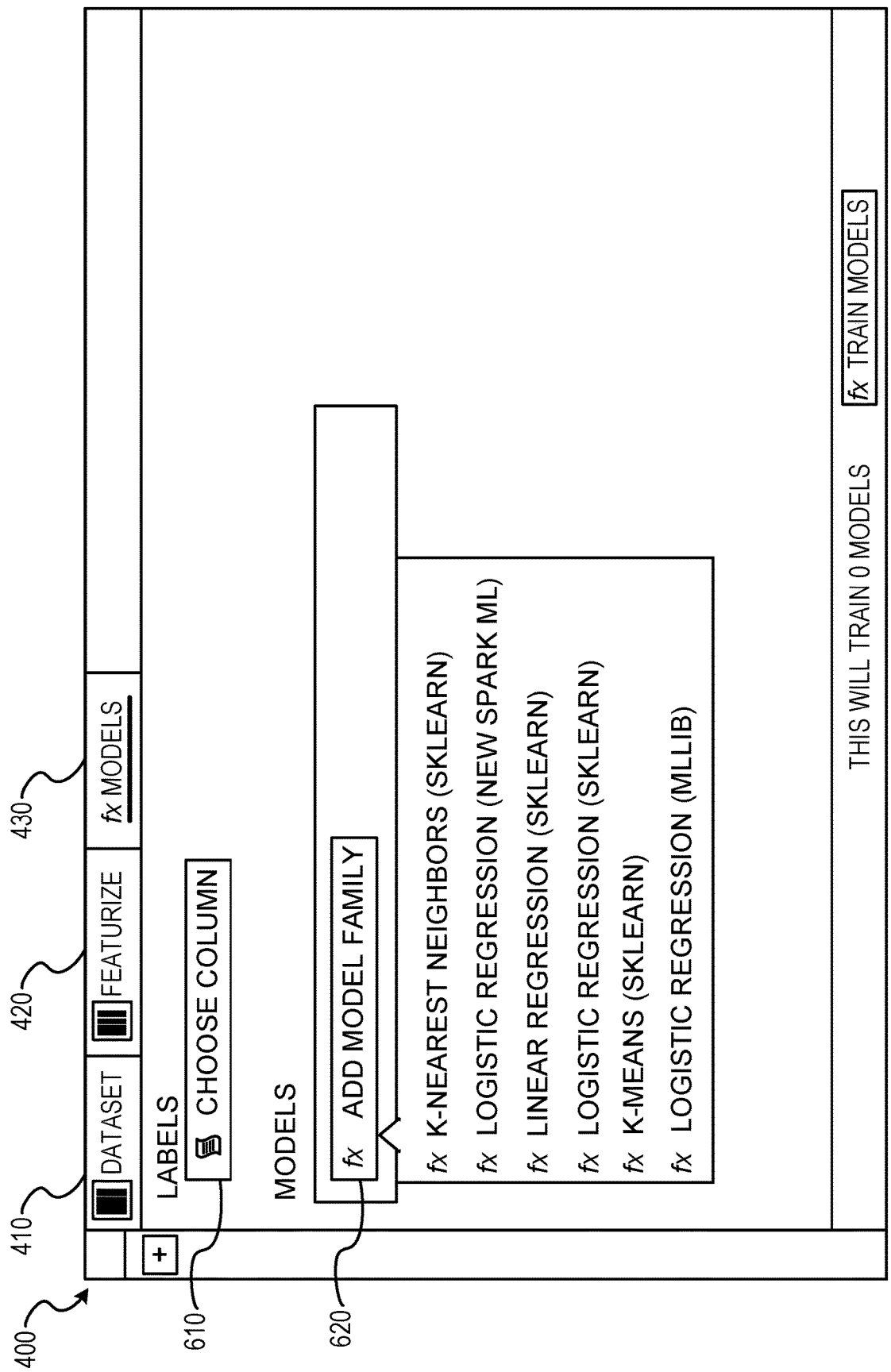
FIG. 6 is a graphical user interface comprising display elements for comparative modeling of data sets using variable machine-learning techniques, according to various example embodiments.

In some embodiments, the set of machine-learning algorithms include a plurality of machine-learning or model algorithms. The set of machine-learning algorithms may include K-Nearest Neighbor, Logistic Regression, Linear Regression, K-Means, and other suitable machine-learning or modeling algorithms. Although described with specified machine-learning or modeling algorithms, it should be understood that the set of machine-learning algorithms may include any suitable machine-learning or modeling algorithm. In some instances, the set of machine-learning algorithms may include a plurality of variations of a single machine-learning algorithm. For example, as shown in FIG. 6, the models may include three instances of logistic regression. The instances of logistic regression may reflect differing implementations of specific models or machine-learning algorithms, differing platforms running a selected machine-learning algorithm, or differing computer languages or environments comprising the selected machine-learning algorithm. For example, the set of machine-learning algorithms may include L1 and L2 selection options. L1 may be understood as a least absolute deviations (LAD), least absolute errors (LAE) algorithm. L1 may minimize (e.g., theoretically minimize) a sum of absolute differences between a target value and an estimated value. L2 may be understood as a least squares error (LSE) algorithm. L2 may minimize (e.g., theoretically minimize) a sum of a square of differences between a target value and an estimated value. As described in more detail below, K-Means may identify or analyze two or more clusters to perform vector quantization. K-Means may partition observations into specified clusters such that each observation belongs to the cluster with the nearest mean. Differing models, generated by differing machine-learning algorithms, may have different parameters and enable exploration of a plurality of models based on parameter combinations simultaneously.

The K-Nearest Neighbor algorithm may comprise an instance-based learning classification or non-generalizing learning. The K-Nearest Neighbor algorithm may store instances of training data without constructing a general internal model. In some instances, classification by the K-Nearest Neighbor algorithm may be computed from a majority vote (e.g., simple majority) of the nearest neighbors of each point. A query point may be assigned a data class that has the most representatives within the nearest neighbors of the query point. Although described with an example embodiment, it should be understood that the K-Nearest Neighbor algorithm may be implemented in any suitable manner, such as a K-Nearest Neighbor regression algorithm or a K-Nearest Neighbor outlier algorithm.

The K-Means algorithm may comprise operations or processes to cluster data by testing or trying separate samples, within the set of data, in n groups of equal variance. The K-Means algorithm may minimize (e.g., theoretically or effectively minimize) a criterion known as inertia or within-cluster sum-of-squares. The K-Means algorithm may include specification of a number of clusters. In some embodiments, the number of clusters is specified by the user upon or after selection of the K-Means algorithm. The K-Means algorithm may scale to large numbers of samples and be used across a large range of application areas and data fields within the set of data.

The logistic regression algorithm may address binary classification problems. The logistic regression algorithm may output a binary logistic regression model. Given a new or additional data point from the selected set of data, the logistic regression model may make predictions by applying a logistic function. Although described with respect to an embodiment of a logistic regression algorithm, it should be understood that the logistic regression algorithm used by the comparative modeling system 150 may be a multinomial logistic regression, an ordered logistic regression, a mixed logit, a Bayesian logistic regression, or any other suitable logistic regression algorithm or model. As shown in FIG. 6, in some embodiments, the logistic regression algorithm is implemented in the SCIKIT-LEARN (SKLEARN) environment. The logistic regression algorithm may also be implemented in a Machine-learning Library (MLlib) environment from APACHE SPARK. For example, in the MLlib environment, the logistic regression algorithm may address binary classification problems, as described above. Although described in example environments, it should be understood that the logistic regression algorithm may be implemented in any suitable environment.

The linear regression algorithm may comprise Ordinary Least Squares Linear Regression, Linear Least Squares, simple linear regression, multivariate linear regression, or any other suitable linear regression algorithm. In some instances, selection of the linear regression algorithm within the graphical user interface 400 may cause the presentation component 250 to generate and cause presentation of a set of distinct linear regression algorithms to specify the type of linear regression being performed on the selected set of data using the selected transform, described above. The presentation component 250 may generate the set of distinct linear regression algorithms by retrieving identifiers of each linear regression algorithm of the set of distinct linear regression algorithms from a database. The presentation component 250 may then identify a graphical representation for each linear regression algorithm within the database. The presentation component 250 causes presentation of the set of distinct linear regression algorithms by rendering or inserting the graphical representations of each linear regression algorithm in the graphical user interface 400. For example, the presentation component 250 may render a pop up window with the graphical representations of the linear regression algorithms as selectable interface elements enabling selection of a linear regression algorithm upon a user interaction with a corresponding selectable interface element. The presentation component 250 may also render the graphical representations within the graphical user interface 400 such as within a drop down menu, within a newly generated tab or set of interface elements within the graphical user interface 400, or in any other suitable manner.

The presentation component 250 generates and causes presentation of the graphical user interface 400, including the model family input 430. As shown in FIG. 4, the model input 430 may be a selectable graphical interface element such as a tab. In some instances, selection of the model input 430 causes the presentation component 250 to generate and cause presentation of one or more selectable interface elements. As shown in FIG. 6, selection of the model input 430 causes the presentation component 250 to cause presentation of a label input 610 and a model input 620. The label input 610 is configured to receive a modeling parameter associated with the set of data being modeled. For example, in some instances, the label input 610 is configured to receive a column label indicating a column of the set of data. The column indicated by the column label may be used as a variable column, values from which may be used as variables in the model.

FIG. 6 also shows a model input 620, which may be presented with the label input 610 or without the label input 610. Where the model input 620 is incorporated in the graphical user interface 400 with the label input 610, one or more models represented within the model input 620 may use a specified data format as input for operation. In some instances, one or more models represented within the model input 620 may employ specified data format inputs while one or more other models are not associated with a label. The model input 620 may be configured to receive an indication of a model (e.g., a machine-learning algorithm, modeling algorithm, or a set of machine-learning or modeling algorithms). In some instances, the model input 620 receives the indication of a model as a textual input, a selection of a radio button, a selection from a menu (e.g., a drop down menu), or any other suitable input entered through a set of interface elements. As described in more detail below, the access component 210 receives one or more selection of one or more models at least partially through selection of the model input 620.

Returning to FIG. 3, in operation 340, the parameter component 220 determines two or more parameters within the first machine-learning algorithm and two or more parameters within the second machine-learning algorithm. In some embodiments, operation 340 is performed in response to selection of the first machine-learning algorithm and the second machine-learning algorithm using the model input 620, shown in FIG. 6. In some instances, operation 340 is performed automatically upon receipt of the selections for the first and second machine-learning algorithms.

Figure 7:
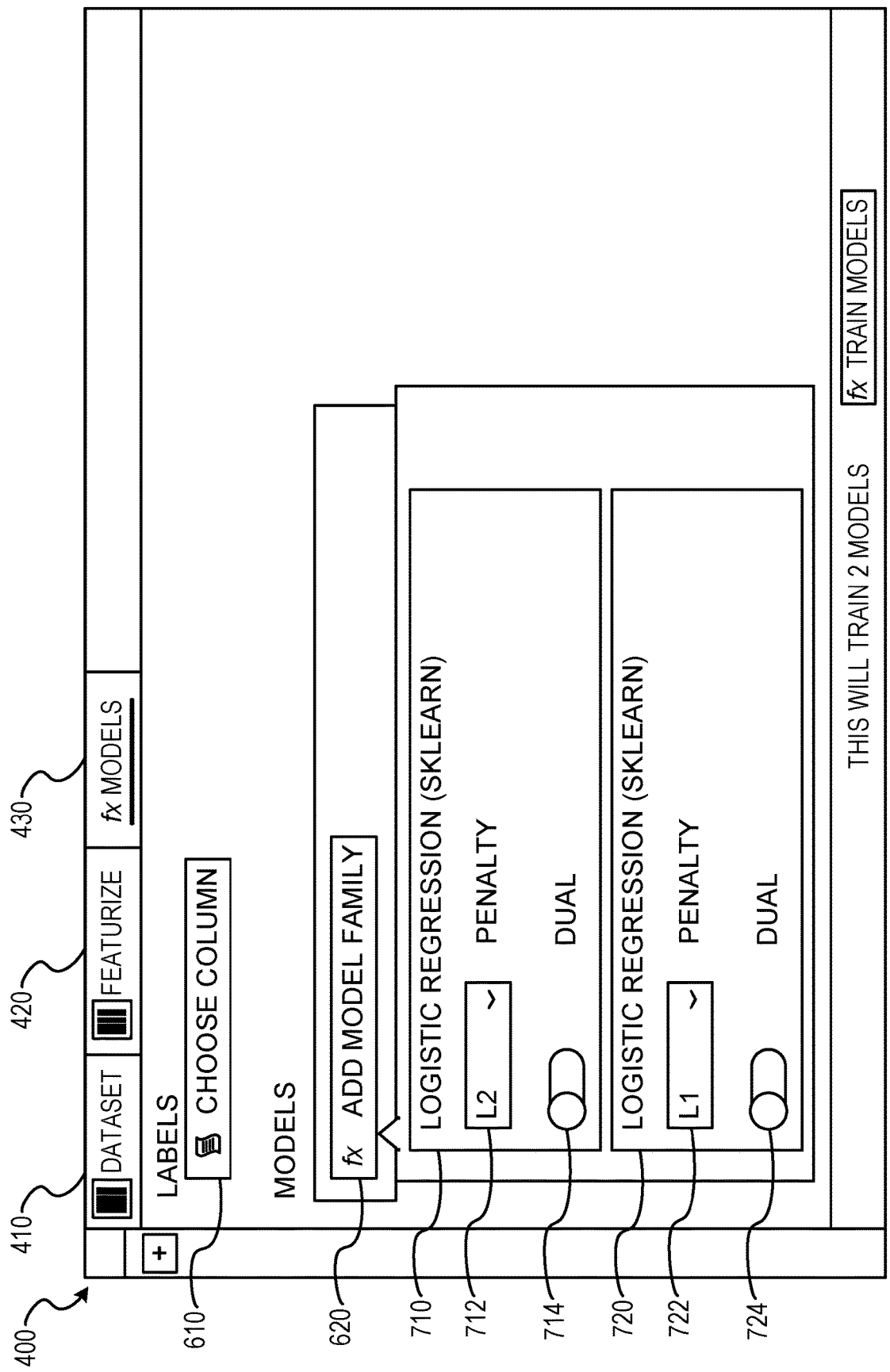
FIG. 7 is a graphical user interface comprising display elements for comparative modeling of data sets using variable machine-learning techniques, according to various example embodiments.

As shown in FIG. 7, once the first machine-learning algorithm has been selected using the model input 620, the presentation component 250 may generate and cause presentation of a representation of the first machine-learning algorithm 710 (e.g., a first algorithm representation 710).

Similarly, once the second machine-learning algorithm has been selected, the presentation component 250 may generate and cause presentation of a representation of the second machine-learning algorithm 720 (e.g., a second algorithm representation 720). Within each algorithm representation, the presentation component 250 generates one or more parameter elements. As shown in FIG. 7, the first algorithm representation 710 is provided with a first parameter element 712 and a second parameter element 714. Similarly, the second algorithm representation 720 is provided with a first parameter element 722 and a second parameter element 724. As shown, the first parameter elements 712 and 722 may be associated with a penalty. The penalties may comprise L1 and L2 penalties. L1 penalties may be absolute value penalties and L2 penalties may be quadratic penalties. L1 and L2 penalties, used in logistic regression, may reduce estimates of regression coefficients toward zero. The regression coefficients may be estimated with respect to a maximum likelihood estimate. The reduction may prevent overfit from collinearity or high-dimensionality. In some instances, the first parameter elements 712 and 722 may be used to specify a norm used in penalization.

The second parameter elements 714 and 724 are selectable elements configured to enable dual or primal formulation. Dual formulation may be implemented for L2 penalties with a libliner solver. In some instances, where samples of the data set are greater in number than the features, enabling dual formulation may be preferred or set as default. Although the first parameter elements 712 and 722 and the second parameter elements 714 and 724 are described using an example embodiment, it should be understood that each model, model family, or machine-learning algorithm may include one or more parameters which are selectable by the user to assist in tailoring selected models. In some instances, selecting, indicating, hovering, or other interface actions indicating interest in a parameter element causes the presentation component 250 to cause display of additional information relating to the parameter element of interest and use cases for the parameter element of interest.

Referring again to FIG. 3, in operation 350, the modeling component 230 generates a plurality of first models using the first machine-learning algorithm. In some example embodiments, operation 350 is performed in response to selection of a first modeling element configured to initiate modeling of the selected set of data, transformed according to the selected transform scheme, and using the first machine-learning algorithm.

In operation 360, the modeling component 230 generates a plurality of second models using the second machine-learning algorithm. In some example embodiments, operation 360 is performed in response to selection of a second modeling element configured to initiate modeling of the selected set of data, transformed according to the selected transform scheme and using the second machine-learning algorithm. In some instances, the first modeling element and the second modeling element may be a single combined modeling element causing operations 350 and 360 to be performed upon selection. In some embodiments, the first modeling element and the second modeling element may be separate modeling elements corresponding to a single machine-learning algorithm.

In operation 370, the comparison component 240 determines one or more comparison metric values for each of the plurality of first models and the plurality of second models. In some embodiments, the plurality of first models and the plurality of second models output data in specified formats. Each output format may be associated with a specified presentation format. The presentation formats may be suggested, recommended, or otherwise suitable presentation styles or parameters for viewing the model output. The comparison component 240 may determine the one or more comparison metric values as a function of outputs or modeled values of the first machine-learning algorithm and the second machine-learning algorithm. In some embodiments, the comparison component 240 determines a comparison metric value as an error rate, a binarization threshold variation (e.g., a selected stepwise change in a binarization threshold), an accuracy value, or other suitable model output, model parameters, model variables, or combinations thereof. In some embodiments, the comparison component 240 determines the comparison metric values automatically in response to selection of the first machine-learning algorithm and the second machine-learning algorithm. In some instances, the comparison component 240 determines the comparison metric values based on one or more selections within the graphical user interface 400. For example, the comparison component 240, upon initiation of modeling, may identify a selection of the first machine-learning algorithm and a selection of the second machine-learning algorithm. The comparison component 240 may then identify one or more parameter selections from among the selections of the first and second machine-learning algorithms. The comparison component 240 may then determine, from among the selected parameters, the one or more comparison metric values.

Figure 8:
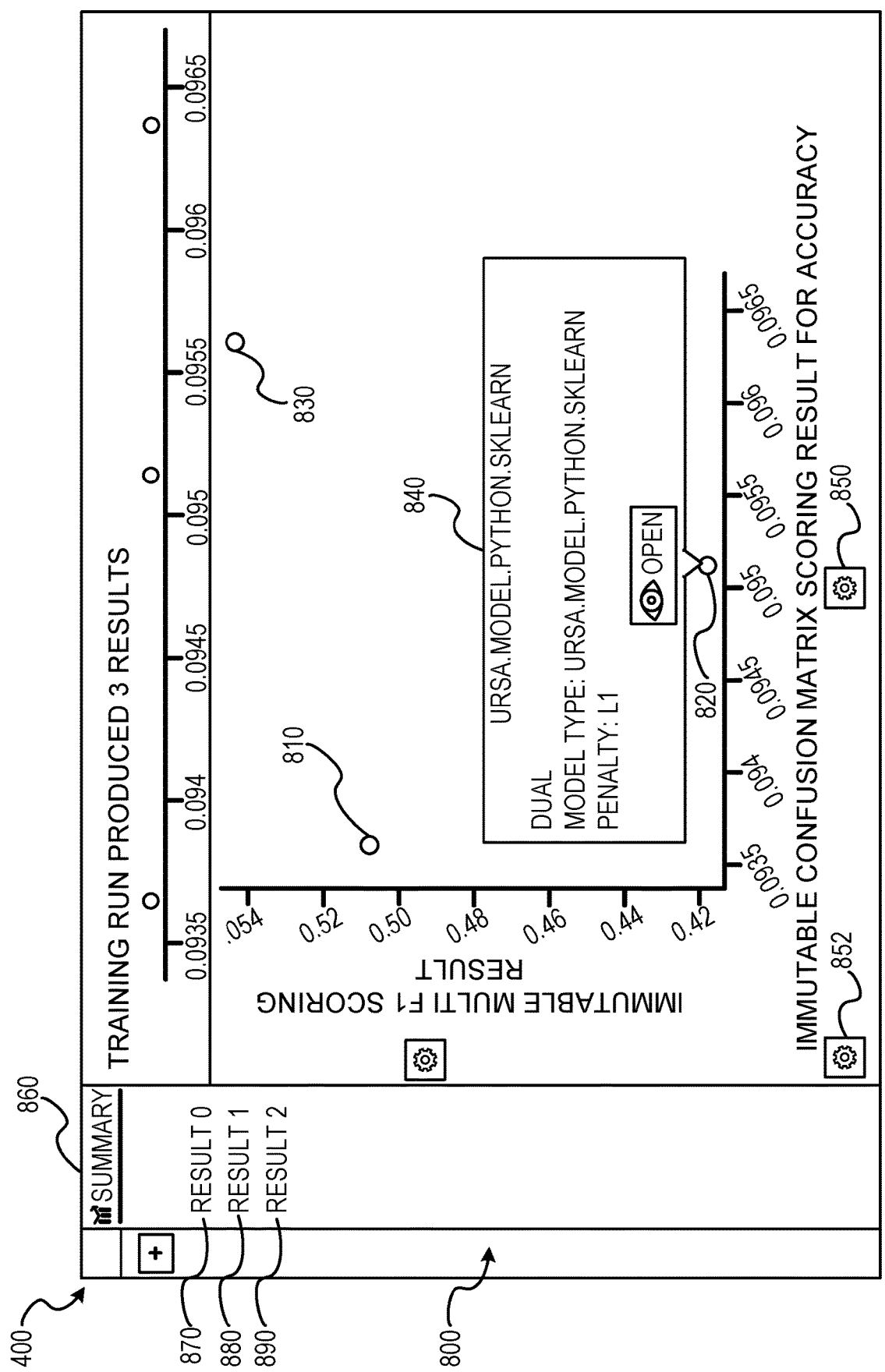
FIG. 8 is a graphical user interface comprising display elements for results of comparative modeling of data sets using variable machine-learning techniques, according to various example embodiments.

In operation 380, the presentation component 250 causes presentation of the comparison metric values for the plurality of first models and the plurality of second models. The presentation component 250 may cause presentation of a set of results of the models in the graphical user interface 400. In some embodiments, the set of results comprise the comparison metric values plotted against one another, against a static value, or against another variable value. As shown in FIG. 8, results may be presented within a result depiction 800. In some example embodiments, the result depiction is a graphical representation of results for one or more machine-learning algorithms making predictions or otherwise processing data of the selected set of data modified by a selected transform scheme. In FIG. 8, the graph plots "F1," a binary metric score interpreting precision and recall of a test (e.g., models generated using the machine-learning algorithms), against accuracy values generated for the model. Precision may be calculated as a number of correct positive results divided by a number of all positive results. Recall may be calculated as a number of correct positive results divided by a number of positive results that should have been returned. In some instances, the F1 score is calculated as a weighted average of calculated precision and recall values. FIG. 8 shows three result representations 810, 820, and 830. Each result representation 810-830 represents a result of a model generated by from a selected machine-learning algorithm. As shown, the result representations 810-830 are positioned as a function of the F1 score and the accuracy values. In some example embodiments, each result representation 810-830 is a selectable interface element generated and presented by the presentation component 250. Although shown as selectable interface elements on a graph, it should be understood that additional result representations (e.g., textual representations or graphical representations) may include selectable elements configured to expand or provide detail on the results or an underlying model generated for the results.

Interaction (e.g., clicking, hovering, selecting, tapping, touching) with a result representation may cause the presentation component 250 to generate a detail element 840. The detail element 840 may be comprise information about the specified result. For example, the detail element 840 may include a model indicator containing information detailing a model represented by the result, a parameter indicator detailing information describing one or more parameter selections for a selected machine-learning algorithm, and any other suitable information. In some instances, additional suitable information may describe one or more of the model, the data set, the transform scheme, the machine-learning algorithm, or the comparison metric value.

In some embodiments, the result depiction 800 may include a modification element 850. As will be explained in more detail below, the modification element 850 may be a selectable interface element. Selection of the modification element 850 may cause the presentation component 250 to cause presentation of a modification list. The modification list may comprise one or more modification schemes enabling alteration of the result depiction. Selection of a modification scheme may alter the result depiction 800 based on one or more comparison metric values identified by the comparison component 240. For example, selection of a modification element on or proximate to an x-axis allows configuration or manipulation of the x-axis, the information represented by the x-axis, or the values associated therewith. Selection of a modification element on or proximate to the y-axis allows configuration or manipulation of the y-axis. In these embodiments, the modification elements allow use of different graph types and different inputs into the graphs. In some embodiments, selection of a modification element, such as modification element 852, allows configuration of the graph type, which may also change the input configurations available.

As shown in FIG. 8, the result depiction 800 includes a result summary 860. The result summary may include one or more summary indicators 870-890. The one or more summary indicators 870-890 may each relate to a single model generated from a selected machine-learning algorithm. The one or more summary indicators 870-890 may be selectable interface elements. Interaction with the one or more summary indicators 870-890 causes presentation component to access and cause presentation of summary information describing a specified result representation. The summary information may comprise a model title for a model represented by the result, a parameter indicator detailing information describing one or more parameter selections for a selected machine-learning algorithm, and any other suitable information. In some embodiments, interaction with a summary indicator, in order to cause presentation of the summary information, comprises hovering with a selection tool (e.g., a mouse pointer or a finger) over the summary indicator.

Figure 9:
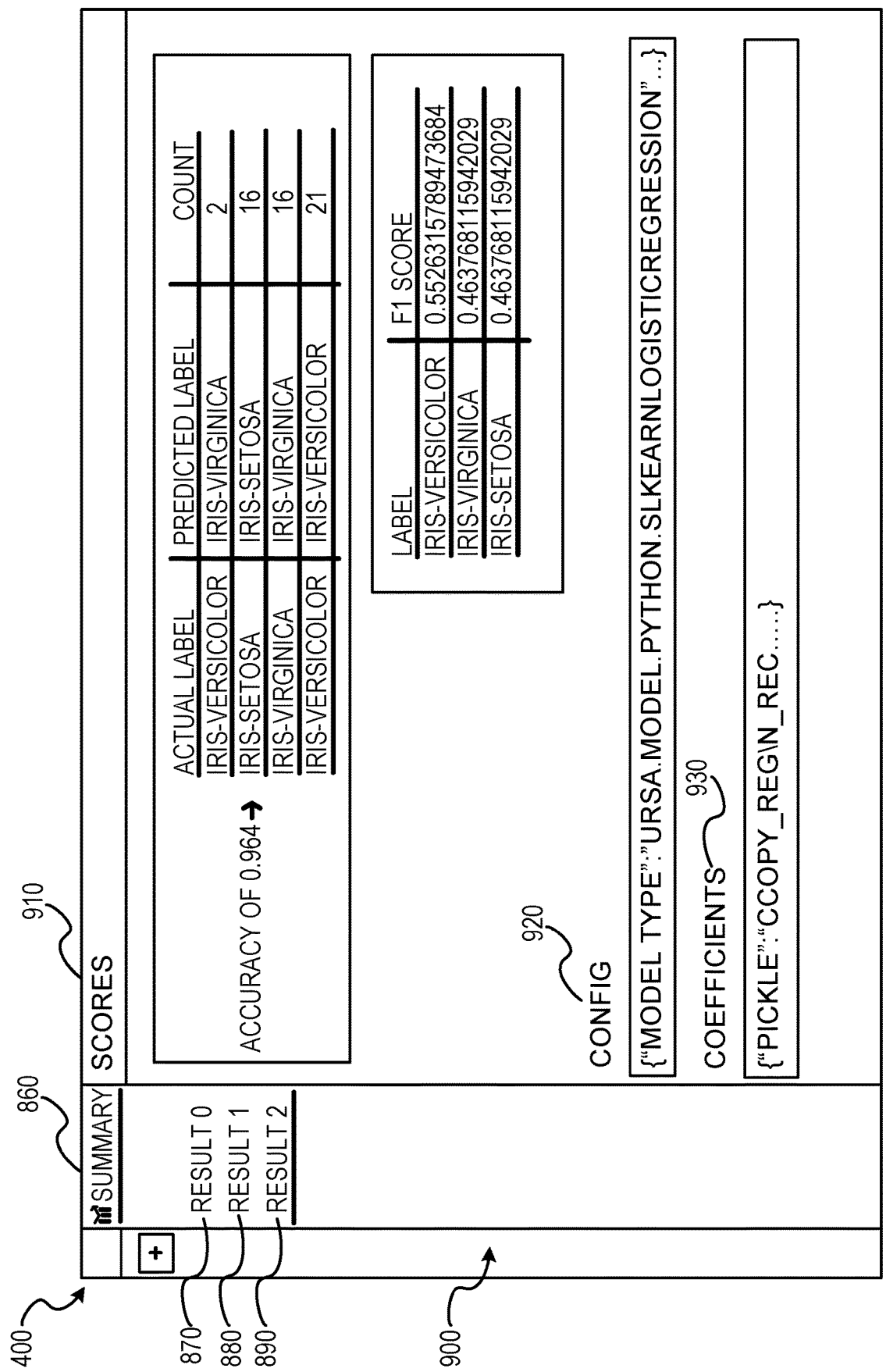
FIG. 9 is a graphical user interface comprising display elements for results of comparative modeling of data sets using variable machine-learning techniques, according to various example embodiments.

In some instances, selection (e.g., clicking or tapping) of a summary indicator causes the presentation component 250 to generate and cause presentation of a result detail representation 900, as shown in FIG. 9. The result detail representation 900 may include detailed information for a generated result set, a generated model, a selected set of data, a selected transform scheme, and one or more selected machine-learning algorithms. As shown in FIG. 9, the result detail representation 900 comprises a score indicator 910, a configuration indicator 920, and a coefficient indicator 930. The score indicator 910 may include information relating to accuracy or other comparison metric values, columns of sets of transformed data, F1 score, and any other suitable information. The configuration indicator 920 comprises information used to populate a summary indicator for the result. The coefficient indicator 930 may describe coefficients generated or used in generating the model using the selected set of data and the one or more selected machine-learning algorithms.

Figure 10:
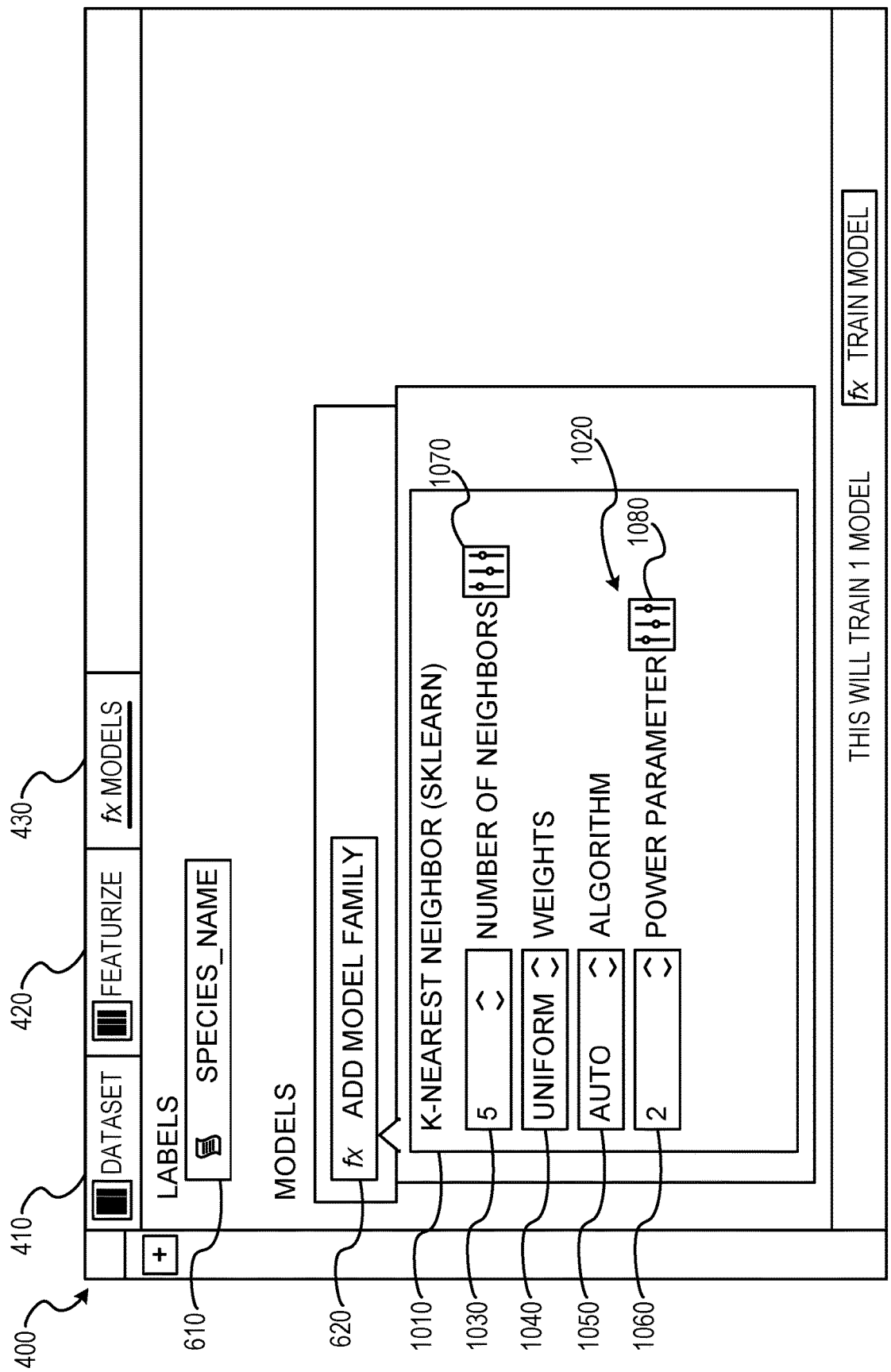
FIG. 10 is a graphical user interface comprising display elements for comparative modeling of data sets using variable machine-learning techniques, according to various example embodiments.

As shown in FIGS. 10-14, in some example embodiments, the method 300 generates a plurality of discrete models and a plurality of discrete sets of results from a single selected machine-learning algorithm and a plurality of selected parameters. In these embodiments, the comparative modeling system 150 may iteratively explore and generate models using the machine-learning algorithm, the parameters, and the set of data. In FIG. 10, a single model (e.g., machine-learning algorithm) is selected. In response to selection of the model, the presentation component 250 generates and causes presentation of an algorithm representation 1010 within the graphical user interface 400, as shown in FIG. 10. Within the algorithm representation 1010, the presentation component 250 may generate a set of parameter elements 1020. As shown in FIG. 10, the parameter elements for the algorithm representation 1010, representing a K-Nearest Neighbor algorithm, may include a neighbor element 1030, a weight element 1040, an algorithm element 1050, and a power element 1060. The neighbor element 1030 represents a number of neighbors used in generating one or more models using the K-Nearest Neighbor algorithm. In some embodiments, the neighbor element 1030 includes an input field enabling entry of a value for the number of neighbors to be evaluated using the selected algorithm. In some embodiments, the input field may be a text input field, a set of radio buttons, a drop down menu, a wheel menu, or any other suitable menu.

In some embodiment, the weight element 1040 corresponds to a dynamic weight function used in generating prediction models. The weight function may be uniform such that all points in each neighborhood are weighted equally. The weight function may provide distance-based weights. In these instances, weights are generated using or based on an inverse of a distance between points in a specified neighborhood. Closer neighbors within a neighborhood may have a greater weight (e.g., influence) on immediate neighbors than neighbors which are more distant. The weight function may also be user defined. The user defined weight function may receive values from the user as an array of distances and return an array containing calculated weights. The algorithm element 1050 corresponds to one or more algorithms used to calculate nearest neighbors. The algorithm element 1050 may enable selections of differing predetermined or user supplied algorithms. In some instances, the algorithm element 1050 includes selection for a BallTree algorithm, a KDTree algorithm, a brute force algorithm, or an automated selection. The automated selection causes the modeling component 230 to determine an appropriate algorithm from options provided within the algorithm element 1050 based on one or more values passed through selections of the parameter elements. The power element 1060 may correspond to a Minkowski Metric, having elements defined by a matrix. Values entered for the power element 1060 may be equivalent to known distances such as the Manhattan distance, the Euclidean distance, or an arbitrary Minkowski distance.

Figure 11:
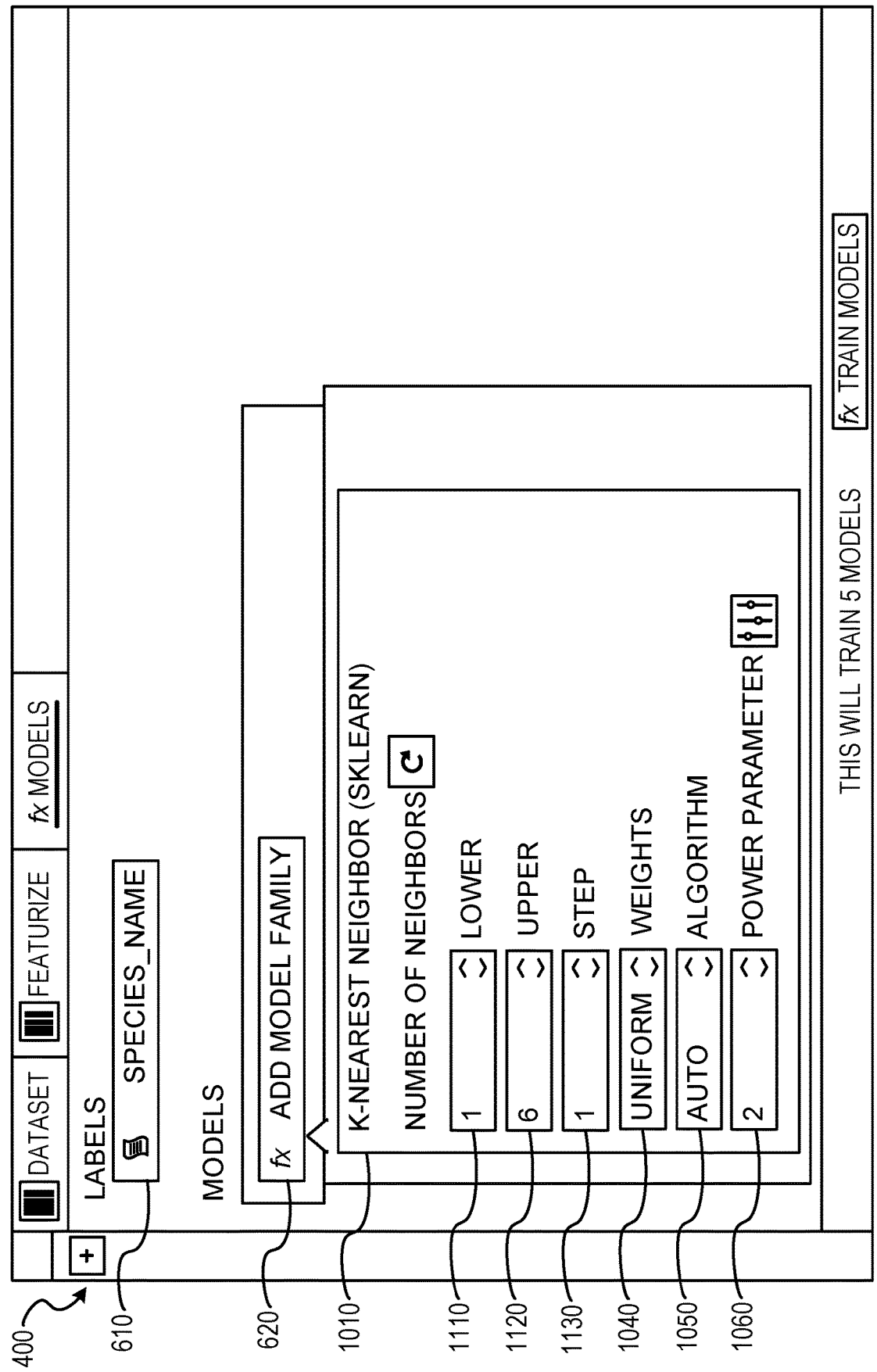
FIG. 11 is a graphical user interface comprising display elements for comparative modeling of data sets using variable machine-learning techniques, according to various example embodiments.

In some embodiments, the neighbor element 1030 includes a neighbor adjustment element 1070. Selection of the neighbor adjustment element 1070 causes the presentation component 250 to generate and cause presentation of a set of neighbor parameter values for the neighbor element 1030, as shown in FIG. 11. As shown, the set of neighbor parameter values include a lower bound element 1110, an upper bound element 1120, and a step element 1130. Once entered, the set of neighbor parameter values enables the modeling component 230 to iteratively generate a set of models using the upper bound and the lower bound selected for the neighbor adjustment element 1070. In some embodiments, the iterative generation of the set of models generates a number of models equal to a number of steps or segments identified between the lower bound and the upper bound selected among the set of neighbor parameter values. For example, as shown in FIG. 11, where the lower bound value is one neighbor, the upper bound value is six neighbors, and the step value is one, the single selected machine-learning algorithm causes the modeling component 230 to train and generate five models. By way of further example, where the lower bound is two, the upper bound is four, and the step is one, the modeling component 230 generates three models. The three models may be equivalent to three k-neighbor models (e.g., k=2, k=3, and k=4). Selection of the upper bound, lower bound, and the step enables limited selections to result in generation of a number of models simultaneously, and enable comparison of the separate results together using the presentation component 250. The simultaneous generation and comparison of the distinct models enables better models while avoiding over-fitting.

Figure 12:
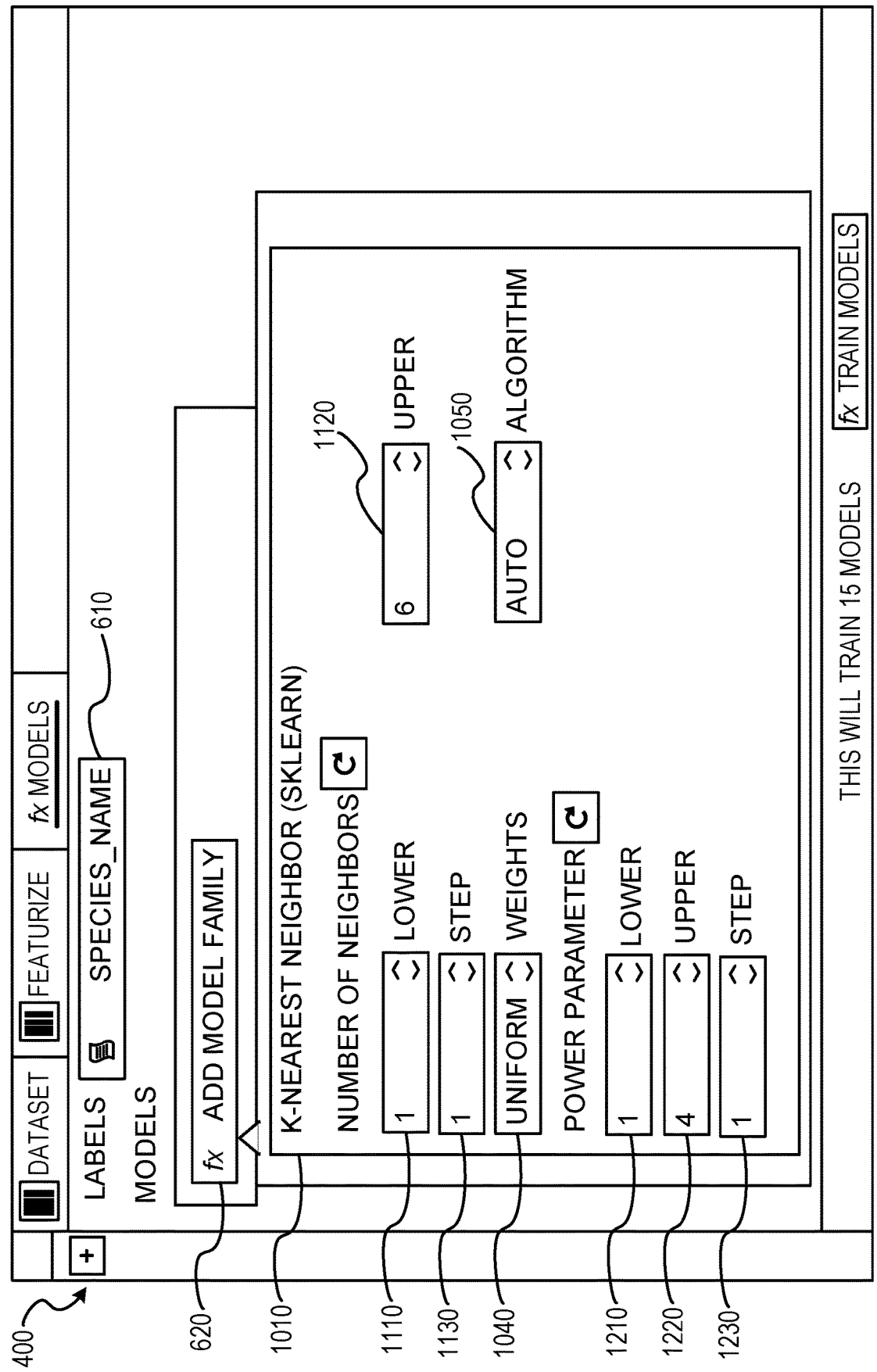
FIG. 12 is a graphical user interface comprising display elements for comparative modeling of data sets using variable machine-learning techniques, according to various example embodiments.

In some instances, as shown in FIG. 10, the power element 1060 includes a power adjustment element 1080. Selection of the power adjustment element 1080 causes the presentation component 250 to generate and cause presentation of a set of power parameter values, as shown in FIG. 12. The set of power parameter values, as shown, include a lower bound element 1210, an upper bound element 1220, and a step element 1230. Once entered, the set of power parameter values enables the modeling component 230 to iteratively generate the set of models using the upper bound and the lower bound selected for the power adjustment element 1080. The iterative generation of the set of models may generate a number of models equal to a number of steps or segments identified between the lower bound and the upper bound selected from the power adjustment element 1080. Where values have been selected for the lower bound element 1110, the upper bound element 1120, and the step element 1130 from the neighbor adjustment element 1070, the modeling component 230 iteratively generates the set of models using the selections from both of the neighbor adjustment element 1070 and the power adjustment element 1080. In these instances, the set of models may be generated to include a model for each step between the lower bound and the upper bound selected for the power adjustment element 1080 for each step between the lower bound and the upper bound selected for the neighbor adjustment element 1070. For example, where the selections of the neighbor adjustment element 1070 would result in five models being trained, selections of the power adjustment element 1080 including three steps would cause the modeling component 230 to generate fifteen models.

Figure 13:
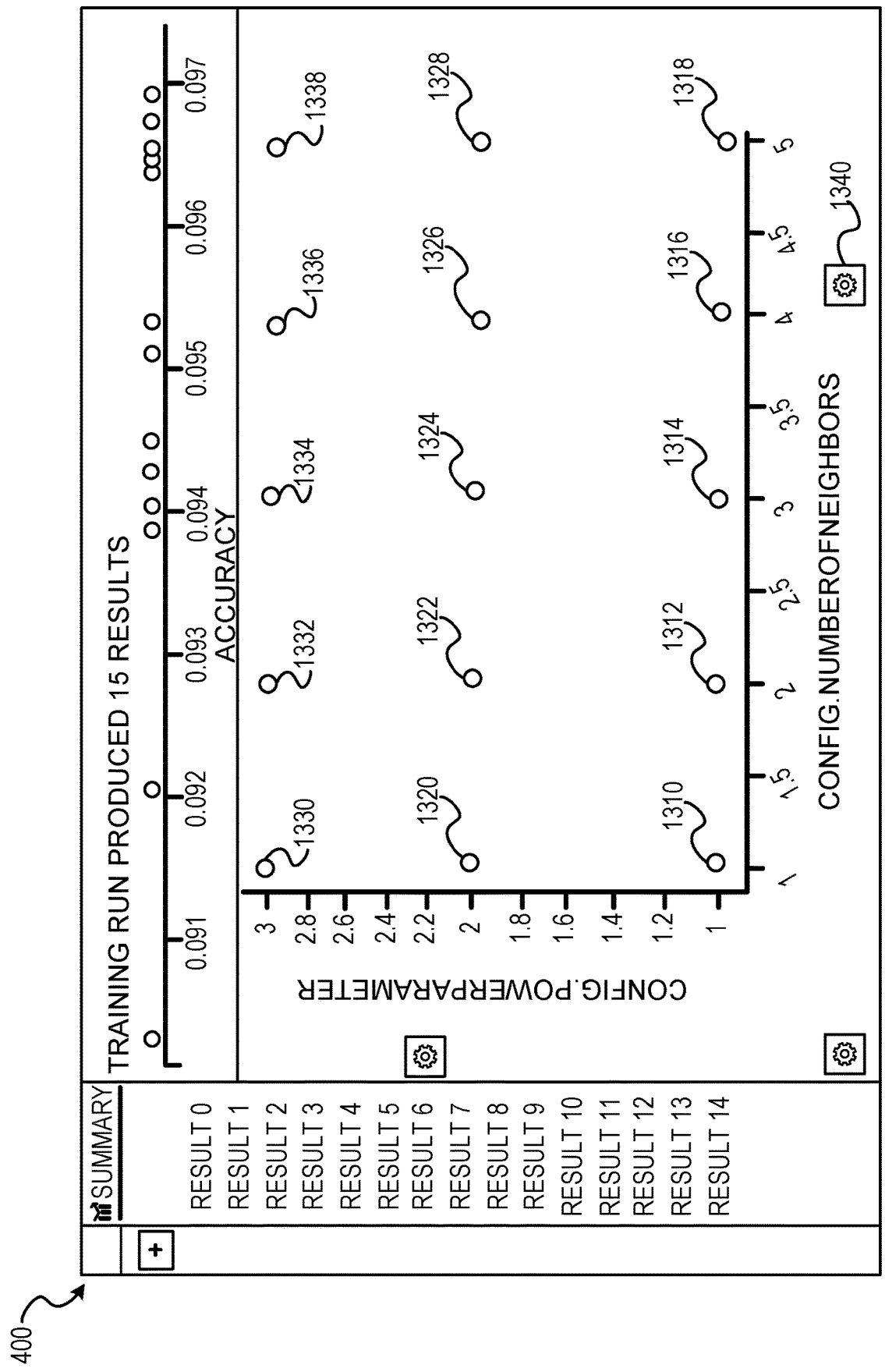
FIG. 13 is a graphical user interface comprising display elements for results of comparative modeling of data sets using variable machine-learning techniques, according to various example embodiments.
Figure 14:
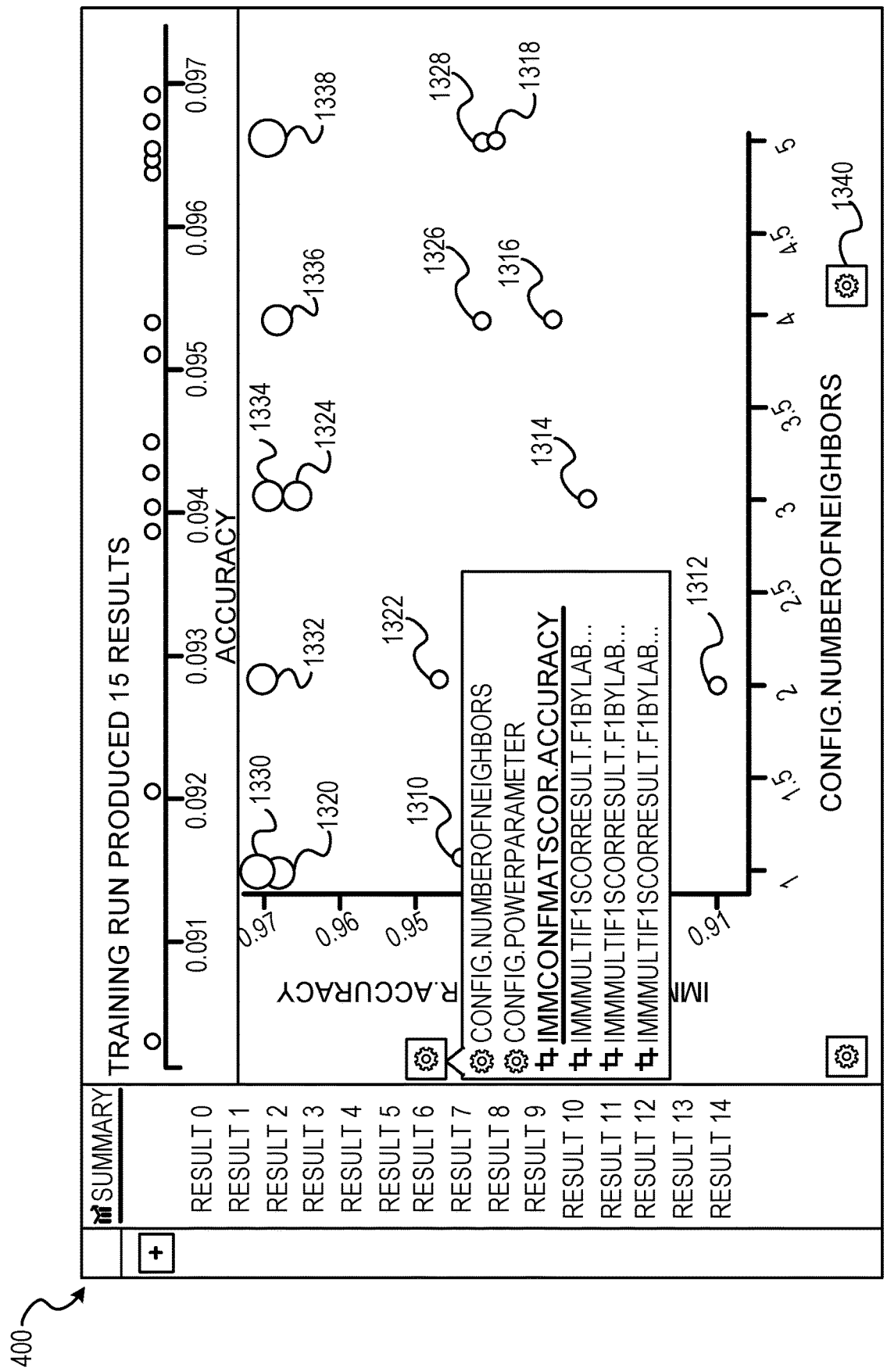
FIG. 14 is a graphical user interface comprising display elements for results of comparative modeling of data sets using variable machine-learning techniques, according to various example embodiments.

As shown in FIGS. 13 and 14, the presentation component 250 causes presentation of comparison metric values for the plurality of models generated for the selected machine-learning algorithm described above in FIG. 10. The presentation component 250 may cause presentation of the comparison metric values for the plurality of models similarly to or the same as the manner described with respect to operation 380. As shown in FIG. 13, in an embodiment where the combination of selections from the neighbor adjustment element 1070 and the power adjustment element 1080 result in fifteen models being generated by the modeling component 230, the presentation component 250 causes presentation of fifteen comparison metric values 1310-1338. In some instances, as shown in FIG. 13, the comparison metric values 1310-1338 may be presented in a default (e.g., unsorted) presentation along with a set of modification elements 1340. The set of modification elements 1340 are configured to receive input configured to modify presentation of the comparison metric values 1310-1338. In some embodiments, the set of modification elements 1340 each include one or more predetermined sorting or modification schemes for application to the comparison metric values 1310-1338. As shown in FIG. 14, the comparison metric values 1310-1338 are sorted by a selected modification scheme.

Figure 15:
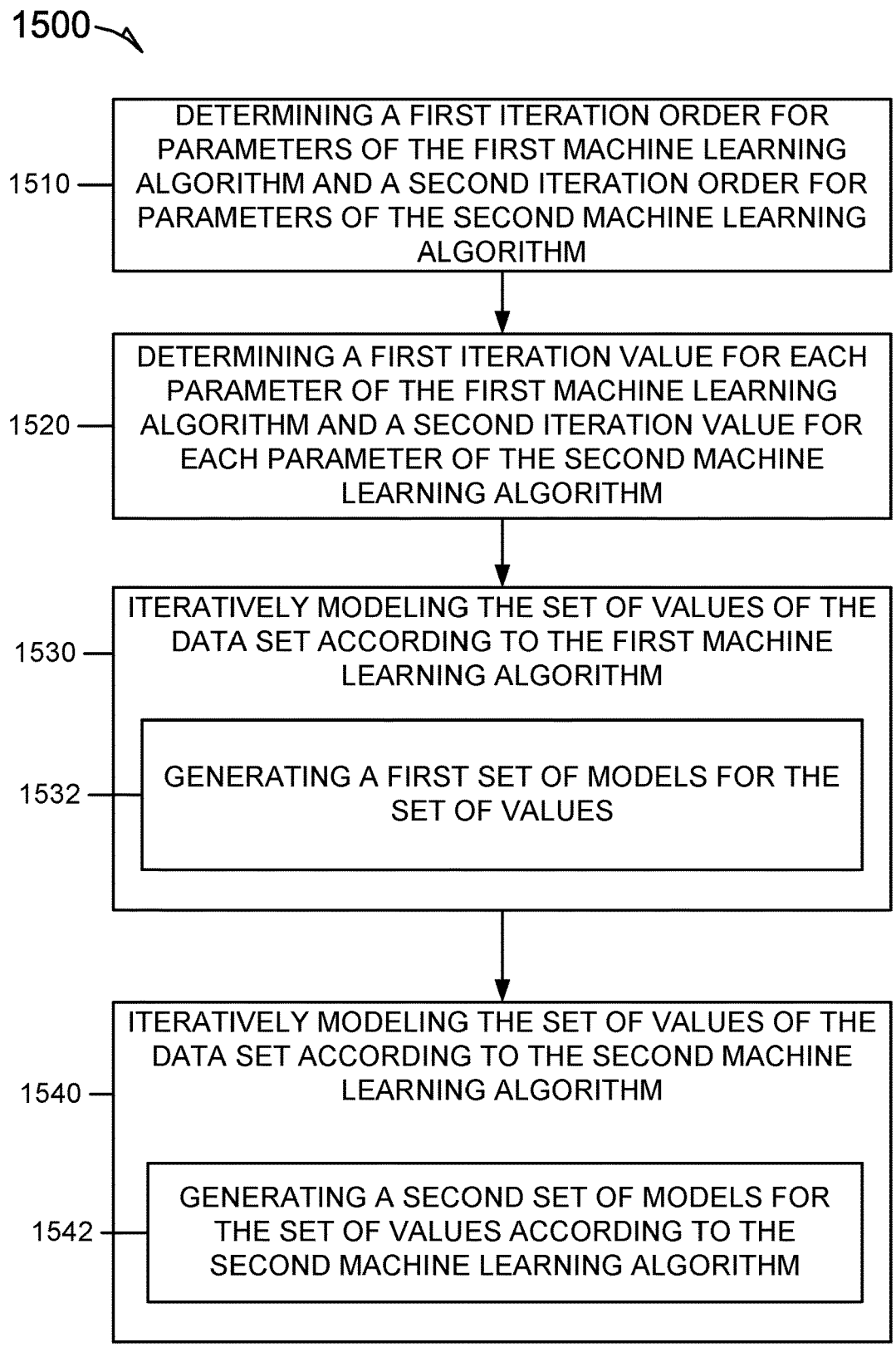
FIG. 15 is a flowchart illustrating operations of a method of generating a graphical user interface to comparatively model data sets using variable machine-learning techniques, according to some example embodiments.

FIG. 15 is a flowchart illustrating operations of the comparative modeling system 150 in performing a method 1500 of generating a graphical user interface to comparatively model data sets using variable machine-learning techniques, according to some example embodiments. Operations of the method 1500 may be performed by the modules described above with respect to FIG. 2. In some example embodiments, one or more operations of the method 1500 are performed as part or sub-operations of one or more operations of the method 300. In some instances, the method 1500 may include one or more operations of the method 300.

In operation 1510, the iteration component 260 determines a first iteration order for the two or more parameters within the first machine-learning algorithm and a second iteration order for the two or more parameters within the second machine-learning algorithm. For example, the iteration component 260 may determine that a model is to contain between one and five layers and up to ten nodes per layer. In some embodiments, operation 1510 is performed in response to receiving selection of and values for parameters represented by the first parameter elements 712 and 722 and the second parameter elements 714 and 724. Although described with respect to an example embodiment, it should be understood that the iteration component 260 may determine the first iteration order and the second iteration order by selection of any suitable parameters presented by the presentation component 250. In some instances, the first iteration order and the second iteration order may be determined from a set of upper and lower bounds and a step value indicating a number, frequency, or order of iterations occurring between the upper and lower bounds for each of the first machine-learning algorithm and the second machine-learning algorithm.

In operation 1520, the iteration component 260 determines a first iteration value for each parameter of the two or more parameters within the first machine-learning algorithm and a second iteration value for each parameter of the two or more parameters within the second machine-learning algorithm. In some embodiments, the iteration component 260 determines the first iteration value by identifying a parameter value for the first machine-learning algorithm, which represents a lower bound. For example, the lower bound may be a number of neighbors, a penalty, or any other suitable lower bound. The iteration component 260 may determine the second iteration value for the second machine-learning algorithm similarly to or the same as the determination of the first iteration value.

In operation 1530, the modeling component 230 iteratively models the set of values of the data set by processing the set of values according to the first machine-learning algorithm according to the first iteration order and the first iteration value. In some embodiments, operation 1530 is performed as part of or a sub-operation of operation 350, described above with respect to FIG. 3 and the method 300. As described with respect to FIGS. 10-14, for each selected machine-learning algorithm, the modeling component 230 may generate a model for each step identified within a set of parameter selections.

In some embodiments, operation 1530 includes operation 1532. In operation 1532, the modeling component 230 generates a first set of models for the set of values. Each model of the first set of models corresponds to a different first iteration value of each parameter of the two or more parameters within the first machine-learning algorithm. For example, where a selected machine-learning algorithm includes a first parameter and a second parameter, where the second parameter compliments the first parameter, the modeling component 230 generates an iterative model for each step identified for the second parameter at each step identified for the first parameter. For example, where the first parameter includes ten steps and the second parameter includes five steps, the modeling component 230 may generate three iterative models from the steps of the second parameter for each step of the first parameter. In this example, the modeling component 230 generates fifty models, with each model corresponding to a single step of the second parameter with respect to a single step of the first parameter.

In operation 1540, the modeling component 230 iteratively models the set of values of the data set by processing the set of values according to the second machine-learning algorithm according to the second iteration order and the second iteration value. In some embodiments, operation 1540 is performed as part of or a sub-operation of operation 360, described above with respect to FIG. 3 and the method 300. In some instances, operation 1540 is performed for the second machine-learning algorithm similarly to or the same as operation 1530.

In some embodiments, operation 1540 includes operation 1542. In operation 1542, the modeling component generates a second set of models for the set of values. Each model of the second set of models corresponds to a different second iteration value of each parameter of the two or more parameters within the second machine-learning algorithm. In some instances, operation 1542 is performed for the second machine-learning algorithm similarly to or the same as operation 1532, described above.

Figure 16:
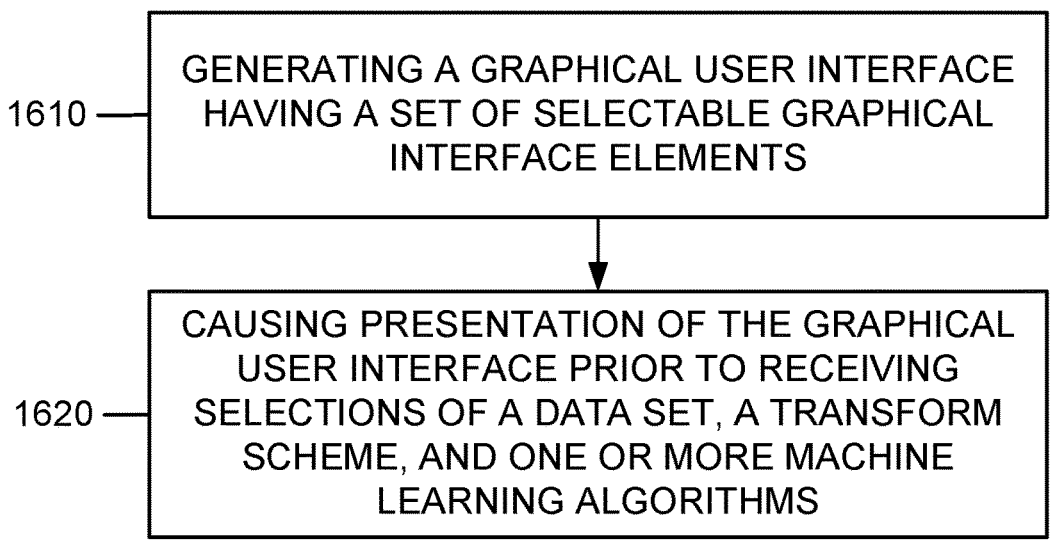
FIG. 16 is a flowchart illustrating operations of a method of generating a graphical user interface to comparatively model data sets using variable machine-learning techniques, according to some example embodiments.

FIG. 16 is a flowchart illustrating operations of the comparative modeling system 150 in performing a method 1600 of generating a graphical user interface to comparatively model data sets using variable machine-learning techniques, according to some example embodiments. Operations of the method 1600 may be performed by the modules described above with respect to FIG. 2. The method 1600 may include or be performed as part or sub-operations of one or more operations of the methods 300 or 1500.

In operation 1610, the presentation component 250 generates a graphical user interface having a set of selectable graphical interface elements. The set of selectable graphical interface elements may include a first graphical interface element, a second graphical interface element, and a third graphical interface element. The first graphical interface element represents a set of data sets. The second graphical interface element represents a set of transform families. The third graphical interface element represents a set of model families. Each model family represents a machine-learning algorithm. An example of the graphical user interface, generated by the presentation component 250, is depicted in and described with respect to FIGS. 4-14.

Although described with respect to a single graphical interface element, in some embodiments, the first, second, and third graphical interface elements are generated as a first set, a second set, and a third set of graphical interface elements, respectively. In these example embodiments, the first set of graphical interface elements includes one or more graphical interface elements, each representing a discrete data set of the set of data sets. The second set of graphical interface elements includes one or more graphical interface elements, each representing a discrete transform family of the set of transform families. The third set of graphical interface elements includes one or more graphical interface elements, each graphical interface element representing a discrete model family of the set of model families.

In operation 1620, the presentation component 250 causes presentation of the graphical user interface prior to receiving selections of the data set, the transform scheme, and one or more machine-learning algorithms. Although described as receiving a single selection of the data set and the transform scheme, it should be understood that the comparative modeling system 150 may receive a plurality of selections for a plurality of data sets and a plurality of transform families.

Figure 17:
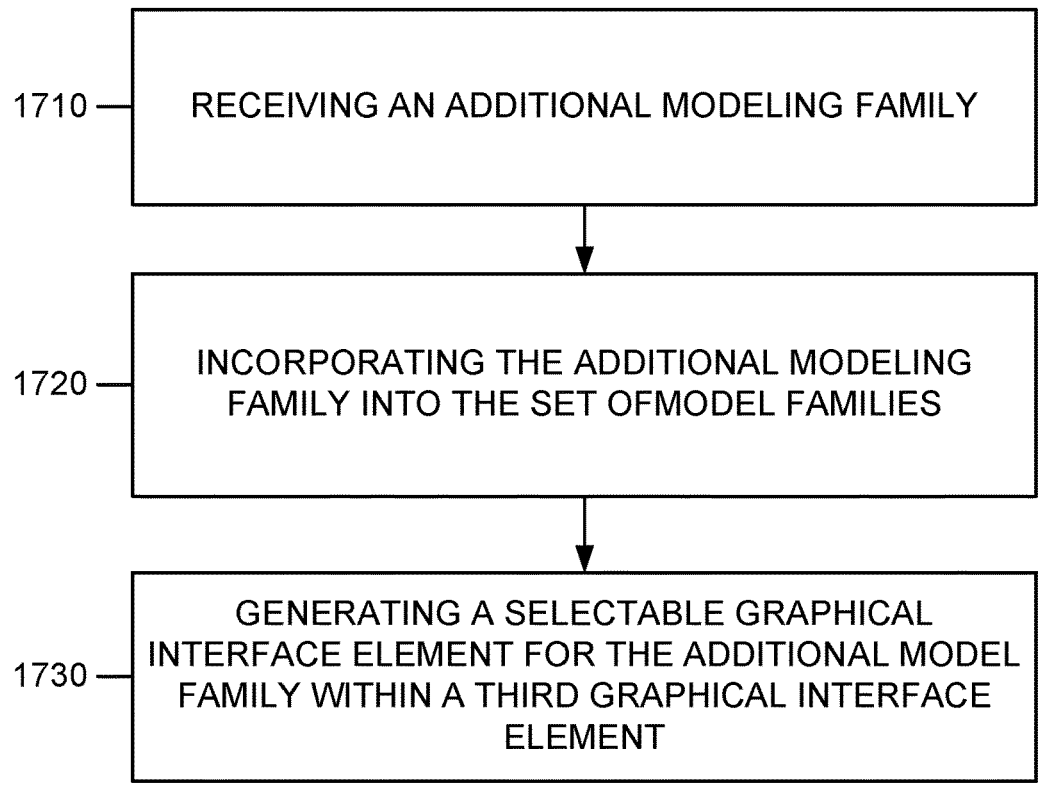
FIG. 17 is a flowchart illustrating operations of a method for generating a graphical user interface to comparatively model data sets using variable machine-learning techniques, according to some example embodiments.

FIG. 17 is a flowchart illustrating operations of the comparative modeling system 150 in performing a method 1700 of generating a graphical user interface to comparatively model data sets using variable machine-learning techniques, according to some example embodiments. Operations of the method 1700 may be performed by the modules described above with respect to FIG. 2. The method 1700 may include or be performed as part or sub-operations of one or more operations of the methods 300, 1500, or 1600.

In operation 1710, the modeling component 230 receives an additional modeling family. The modeling family may include a family identification and a set of code for a machine-learning algorithm. In these embodiments, the set of model families initially occurring within the comparative modeling system 150 may comprise a predetermined set of model families. The predetermined set of model families may be default machine-learning algorithms or machine-learning algorithms appended to a set of default machine-learning algorithms.

In operation 1720, the modeling component 230 incorporates the additional model family into the set of model families. The additional model family (e.g., one or more additional machine-learning algorithms) may be incorporated into the set of model families by the modeling component 230 inserting machine-readable coding for the additional model family into a database containing the set of model families. In some embodiments, the modeling component 230 modifies one or more data structures within the database, when adding the additional model family, to incorporate an identification for the additional model family for inclusion and presentation of a representation of the additional model family in a graphical user interface (e.g., the graphical user interface 400).

In operation 1730, the presentation component 250 generates a selectable graphical interface element for the additional model family within the third graphical interface element. The selectable graphical interface element may include an identification for the additional model family (e.g., a title of a machine-learning algorithm). In some instances, the identification for the additional model family is accessed from the data structure within the database. Upon accessing the identification within the data structure, the presentation component 250 may apply the identification to a previously generated interface element template. In some instances, the previously generated interface element template may be an interface element having a text box configured to receive the identification. Once the identification has been applied to the interface element template, the resulting selectable interface element may be stored within the data structure such that the selectable interface element is associated with one or more of the identification of the additional model family and the code for the machine-learning algorithm.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The components, methods, applications and so forth described in conjunction with FIGS. 1-17 are implemented in some embodiments in the context of a machine and an associated software architecture. The sections below describe representative software architecture(s) and machine (e.g., hardware) architecture that are suitable for use with the disclosed embodiments.

Figure 18:
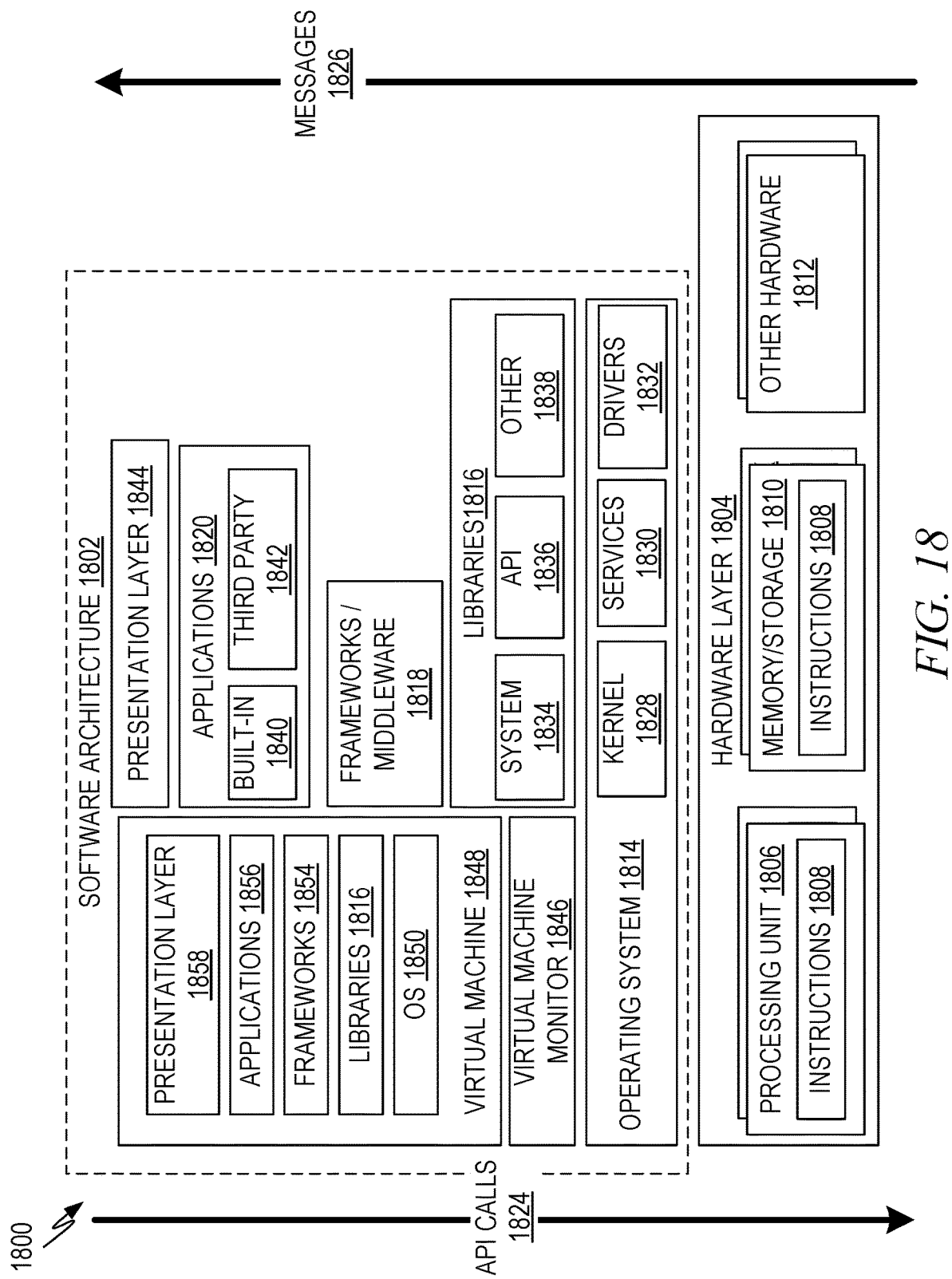
FIG. 18 is a block diagram illustrating an example of a software architecture that may be installed on a machine, according to some example embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here, as those of skill in the art can readily understand how to implement the embodiments of the present disclosure in different contexts from the disclosure contained herein. Software Architecture FIG. 18 is a block diagram 1800 illustrating a representative software architecture 1802, which may be used in conjunction with various hardware architectures herein described. FIG. 18 is merely a non-limiting example of a software architecture and it will be appreciated that many other architectures may be implemented to facilitate the functionality described herein. The software architecture 1802 may be executing on hardware such as machine 1900 of FIG. 19 that includes, among other things, processors 1910, memory 1930, and Input/Output (I/O) components 1950. A representative hardware layer 1804 is illustrated and can represent, for example, the machine 1900 of FIG. 19. The representative hardware layer 1804 comprises one or more processing units 1806 having associated executable instructions 1808. Executable instructions 1808 represent the executable instructions of the software architecture 1802, including implementation of the methods, components and so forth of FIG. 2. Hardware layer 1804 also includes memory and/or storage modules 1810, which also have executable instructions 1808. Hardware layer 1804 may also comprise other hardware as indicated by 1812 which represents any other hardware of the hardware layer 1804, such as the other hardware illustrated as part of machine 1900.

In the example architecture of FIG. 18, the software 1802 may be conceptualized as a stack of layers where each layer provides particular functionality. For example, the software 1802 may include layers such as an operating system 1814, libraries 1816, frameworks/middleware 1818, applications 1820 and presentation layer 1844. Operationally, the applications 1820 and/or other components within the layers may invoke API calls 1824 through the software stack and receive a response, returned values, and so forth illustrated as messages 1826 in response to the API calls 1824. The layers illustrated are representative in nature and not all software architectures have all layers. For example, some mobile or special purpose operating systems may not provide a frameworks/middleware layer 1818, while others may provide such a layer. Other software architectures may include additional or different layers.

The operating system 1814 may manage hardware resources and provide common services. The operating system 1814 may include, for example, a kernel 1828, services 1830, and drivers 1832. The kernel 1828 may act as an abstraction layer between the hardware and the other software layers. For example, the kernel 1828 may be responsible for memory management, processor management (e.g., scheduling), component management, networking, security settings, and so on. The services 1830 may provide other common services for the other software layers. The drivers 1832 may be responsible for controlling or interfacing with the underlying hardware. For instance, the drivers 1832 may include display drivers, camera drivers, Bluetooth® drivers, flash memory drivers, serial communication drivers (e.g., Universal Serial Bus (USB) drivers), WiFi® drivers, audio drivers, power management drivers, and so forth depending on the hardware configuration.

The libraries 1816 may provide a common infrastructure that may be utilized by the applications 1820 and/or other components and/or layers. The libraries 1816 typically provide functionality that allows other software modules to perform tasks in an easier fashion than to interface directly with the underlying operating system 1814 functionality (e.g., kernel 1828, services 1830 and/or drivers 1832). The libraries 1816 may include system 1834 libraries (e.g., C standard library) that may provide functions such as memory allocation functions, string manipulation functions, mathematic functions, and the like. In addition, the libraries 1816 may include API libraries 1836 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1816 may also include a wide variety of other libraries 1838 to provide many other APIs to the applications 1820 and other software components/modules.

The frameworks 1818 (also sometimes referred to as middleware) may provide a higher-level common infrastructure that may be utilized by the applications 1820 and/or other software components/modules. For example, the frameworks 1818 may provide various graphic user interface (GUI) functions, high-level resource management, high-level location services, and so forth. The frameworks 1818 may provide a broad spectrum of other APIs that may be utilized by the applications 1820 and/or other software components/modules, some of which may be specific to a particular operating system or platform.

The applications 1820 includes built-in applications 1840 and/or third party applications 1842. Examples of representative built-in applications 1840 may include, but are not limited to, a contacts application, a browser application, a book reader application, a location application, a media application, a messaging application, and/or a game application. Third party applications 1842 may include any of the built in applications as well as a broad assortment of other applications. In a specific example, the third party application 1842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1842 may invoke the API calls 1824 provided by the mobile operating system such as operating system 1814 to facilitate functionality described herein.

The applications 1820 may utilize built in operating system functions (e.g., kernel 1828, services 1830 and/or drivers 1832), libraries (e.g., system 1834, APIs 1836, and other libraries 1838), frameworks/middleware 1818 to create user interfaces to interact with users of the system. Alternatively, or additionally, in some systems interactions with a user may occur through a presentation layer, such as presentation layer 1844. In these systems, the application/module "logic" can be separated from the aspects of the application/module that interact with a user.

Some software architectures utilize virtual machines. In the example of FIG. 18, this is illustrated by virtual machine 1848. A virtual machine creates a software environment where applications/modules can execute as if they were executing on a hardware machine (such as the machine of FIG. 19, for example). A virtual machine is hosted by a host operating system (operating system 1814 in FIG. 19) and typically, although not always, has a virtual machine monitor 1846, which manages the operation of the virtual machine as well as the interface with the host operating system (i.e., operating system 1814). A software architecture executes within the virtual machine such as an operating system 1850, libraries 1816, frameworks/middleware 1854, applications 1856 and/or presentation layer 1858. These layers of software architecture executing within the virtual machine 1848 can be the same as corresponding layers previously described or may be different.

Example Machine Architecture and Machine-Readable Medium

Figure 19:
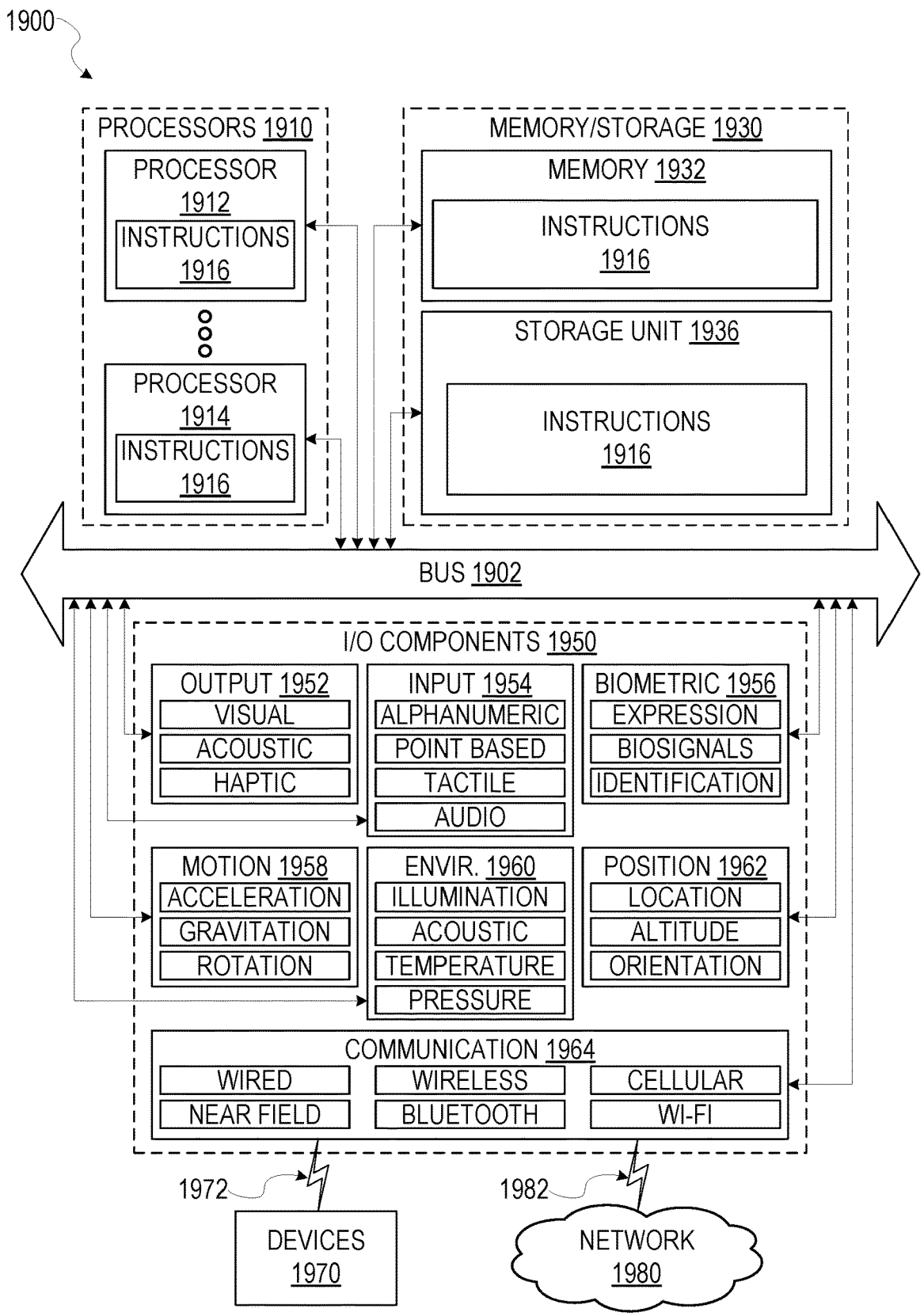
FIG. 19 illustrates a diagrammatic representation of a machine in the form of a computer system within which a set of instructions may be executed for causing the machine to perform any one or more of the methodologies discussed herein, according to an example embodiment.

FIG. 19 is a block diagram illustrating components of a machine 1900, according to some example embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein may be executed. For example, the instructions may cause the machine to execute the flow diagrams of FIGS. 3-17. Additionally, or alternatively, the instructions may implement the modules of FIG. 2, and so forth. The instructions transform the general, non-programmed machine into a particular machine programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by machine 1900. Further, while only a single machine 1900 is illustrated, the term "machine" shall also be taken to include a collection of machines 1900 that individually or jointly execute the instructions 1916 to perform any one or more of the methodologies discussed herein.

The machine 1900 may include processors 1910, memory 1930, and I/O components 1950, which may be configured to communicate with each other such as via a bus 1902. In an example embodiment, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1912 and processor 1914 that may execute instructions 1916. The term "processor" is intended to include multi-core processor that may comprise two or more independent processors (sometimes referred to as "cores") that may execute instructions contemporaneously. Although FIG. 19 shows multiple processors, the machine 1900 may include a single processor with a single core, a single processor with multiple cores (e.g., a multi-core process), multiple processors with a single core, multiple processors with multiples cores, or any combination thereof.

The memory/storage 1930 may include a memory 1932 (e.g., a processor-readable storage device), such as a main memory, or other memory storage, and a storage unit 1936, both accessible to the processors 1910 such as via the bus 1902. The storage unit 1936 and memory 1932 store the instructions 1916 embodying any one or more of the methodologies or functions described herein. The instructions 1916 may also reside, completely or partially, within the memory 1932, within the storage unit 1936, within at least one of the processors 1910 (e.g., within the processor's cache memory), or any suitable combination thereof, during execution thereof by the machine 1900. Accordingly, the memory 1932, the storage unit 1936, and the memory of processors 1910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1916. The term "machine-readable medium" shall also be taken to include any medium, or combination of multiple media, that is capable of storing instructions (e.g., instructions 1916) for execution by a machine (e.g., machine 1900), such that the instructions, when executed by one or more processors of the machine 1900 (e.g., processors 1910), cause the machine 1900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1950 may include a wide variety of components to receive input, provide output, produce output, transmit information, exchange information, capture measurements, and so on. The specific I/O components 1950 that are included in a particular machine will depend on the type of machine. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1950 may include biometric components 1956, motion components 1958, environmental components 1960, or position components 1962 among a wide array of other components. For example, the biometric components 1956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 may include acceleration sensor components (e.g., accelerometer), gravitation sensor components, rotation sensor components (e.g., gyroscope), and so forth. The environmental components 1960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1950 may include communication components 1964 operable to couple the machine 1900 to a network 1980 or devices 1970 via coupling 1982 and coupling 1972, respectively. For example, the communication components 1964 may include a network interface component or other suitable device to interface with the network 1980. In further examples, communication components 1964 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1970 may be another machine or any of a wide variety of peripheral devices (e.g., a peripheral device coupled via a Universal Serial Bus (USB)).

Moreover, the communication components 1964 may detect identifiers or include components operable to detect identifiers. For example, the communication components 1964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1980 or a portion of the network 1980 may include a wireless or cellular network and the coupling 1982 may be a Code Division Multiple Access (CDMA) connection, a Global System for Mobile communications (GSM) connection, or other type of cellular or wireless coupling. In this example, the coupling 1982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1916 may be transmitted or received over the network 1980 using a transmission medium via a network interface device (e.g., a network interface component included in the communication components 1964) and utilizing any one of a number of well-known transfer protocols (e.g., hypertext transfer protocol (HTTP)). Similarly, the instructions 1916 may be transmitted or received using a transmission medium via the coupling 1972 (e.g., a peer-to-peer coupling) to devices 1970. The term "transmission medium" shall be taken to include any intangible medium that is capable of storing, encoding, or carrying instructions 1916 for execution by the machine 1900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:

causing, by one or more processors of a machine, presentation of a graphical user interface having a set of selectable graphical interface elements including a first graphical interface element representing a set of data sets, a second graphical interface element representing a set of transform families, and a third graphical interface element representing a set of model families, each transform family comprising a particular transform scheme for transforming one or more values of a data set from one form to another form, each model family comprising a family identification and a set of code for a particular machine-learning algorithm that generates a particular machine-learning model for one or more values;

receiving, by the one or more processors of a machine, a selection of a particular data set through the graphical user interface, the particular data set including a set of values associated with a set of identifiers;

receiving, by the one or more processors of the machine, a selection of a transform scheme through the graphical user interface, the transform scheme configured to transform one or more values of the particular data set from a first form to a second form;

receiving, by the one or more processors of the machine, a selection of a first machine-learning algorithm and a second machine-learning algorithm through the graphical user interface, the first machine-learning algorithm configured to generate a first machine-learning model for the set of values and the second machine-learning algorithm configured to generate a second machine-learning model for the set of values;

in response to selection of the first machine-learning algorithm and the second machine-learning algorithm, determining a first iteration value for each given first parameter of two or more first parameters within the first machine-learning algorithm, and determining a second iteration value for each given second parameter of two or more second parameters within the second machine-learning algorithm;

iteratively executing, by the one or more processors of the machine, the first machine-learning algorithm, using the two or more first parameters, according to a first iteration order and the first iteration value to process the set of values and generate a plurality of first machine-learning models;

iteratively executing, by the one or more processors of the machine, the second machine-learning algorithm, using the two or more second parameters, according to a second iteration order and the second iteration value to process the set of values and generate a plurality of second machine-learning models;

determining, by the one or more processors of the machine, one or more comparison metric values for data output by each of the plurality of first machine-learning models and the plurality of second machine-learning models; and causing presentation, by the one or more processors of the machine, of the comparison metric values for the data output by the plurality of first machine-learning models and the plurality of second machine-learning models, the presentation comprising a selectable user interface element configured to cause the presentation of a result of at least one of a first machine learning model or a second machine learning model, the result comprising at least one of the comparison metric values.

2. The method of claim 1, further comprising:

determining a first iteration order for the two or more first parameters within the first machine-learning algorithm and a second iteration order for the two or more second parameters within the second machine-learning algorithm.

3. The method of claim 1, wherein iteratively modeling the set of values according to the first machine-learning algorithm further comprises:

generating a first set of machine-learning models for the set of values, each machine-learning model of the first set of machine-learning models corresponding to a different first iteration value of each first parameter of the two or more first parameters within the first machine-learning algorithm.

4. The method of claim 1, wherein iteratively modeling the set of values according to the second machine-learning algorithm further comprises:

generating a second set of machine-learning models for the set of values, each machine-learning model of the second set of machine-learning models corresponding to a different second iteration value of each second parameter of the two or more second parameters within the second machine-learning algorithm.

5. The method of claim 1, wherein the set of model families comprises a predetermined set of model families, the method further comprising:
- receiving an additional model family including another family identification and another set of code for an additional machine-learning algorithm for generating another model for the set of values;
- incorporating the additional model family into the set of model families; and
- generating a selectable graphical interface element for the additional model family within the third graphical interface element.

6. A computer implemented system, comprising:

one or more processors; and a processor-readable storage device comprising processor-executable instructions that, when executed by the one or more processors, cause the one or more processors to perform operations comprising:
- causing presentation of a graphical user interface having a set of selectable graphical interface elements including a first graphical interface element representing a set of data sets, a second graphical interface element representing a set of transform families, and a third graphical interface element representing a set of model families, each transform family comprising a particular transform scheme for transforming one or more values of a data set from one form to another form, each model family comprising a family identification and a set of code for a particular machine-learning algorithm that generates a particular machine-learning model for one or more values;
- receiving a selection of a particular data set through the graphical user interface, the particular data set including a set of values associated with a set of identifiers;
- receiving a selection of a transform scheme through the graphical user interface, the transform scheme configured to transform one or more values of the particular data set from a first form to a second form;
- receiving a selection of a first machine-learning algorithm and a second machine-learning algorithm through the graphical user interface, the first machine-learning algorithm configured to generate a first machine-learning model for the set of values and the second machine-learning algorithm configured to generate a second machine-learning model for the set of values;
- in response to selection of the first machine-learning algorithm and the second machine-learning algorithm, determining a first iteration value for each given first parameter of two or more first parameters within the first machine-learning algorithm, and determining a second iteration value for each given second parameter of two or more second parameters;
- iteratively executing the first machine-learning algorithm, using the two or more first parameters, according to a first iteration order and the first iteration value to process the set of values and generate a plurality of first machine-learning models;
- iteratively executing the second machine-learning algorithm, using the two or more second parameters, according to a second iteration order and the second iteration value to process the set of values and generate a plurality of second machine-learning models;
- determining one or more comparison metric values for data output by each of the plurality of first machine-learning models and the plurality of second machine-learning models; and
- causing presentation of the comparison metric values for the data output by the plurality of first machine-learning models and the plurality of second machine-learning models, the presentation comprising a selectable user interface element configured to cause the presentation of a result of at least one of a first machine learning model or a second machine learning model, the result comprising at least one of the comparison metric values.

7. The system of claim 6, wherein the operations further comprise:
- determining a first iteration order for the two or more first parameters within the first machine-learning algorithm and a second iteration order for the two or more second parameters within the second machine-learning algorithm.

8. The system of claim 6, wherein iteratively modeling the set of values according to the first machine-learning algorithm further comprises:
- generating a first set of machine-learning models for the set of values, each machine-learning model of the first set of machine-learning models corresponding to a different first iteration value of each first parameter of the two or more first parameters within the first machine-learning algorithm.

9. The system of claim 6, wherein iteratively modeling the set of values according to the second machine-learning algorithm further comprises:
- generating a second set of machine-learning models for the set of values, each machine-learning model of the second set of machine-learning models corresponding to a different second iteration value of each second parameter of the two or more second parameters within the second machine-learning algorithm.

10. The system of claim 6, wherein the set of model families comprises a predetermined set of model families, the operations further comprising:
- receiving an additional model family including another family identification and another set of code for a machine-learning algorithm for generating another model for the set of values;
- incorporating the additional model family into the set of model families; and
- generating a selectable graphical interface element for the additional model family within the third graphical interface element.

11. A processor-readable storage device comprising instructions that, when executed by one or more processors of a machine, cause the machine to perform operations comprising:
- causing presentation of a graphical user interface having a set of selectable graphical interface elements including a first graphical interface element representing a set of data sets, a second graphical interface element representing a set of transform families, and a third graphical interface element representing a set of model families, each transform family comprising a particular transform scheme for transforming one or more values of a data set from one form to another form, each model family comprising a family identification and a set of code for a particular machine-learning algorithm that generates a particular machine-learning model for one or more values;

receiving a selection of a particular data set through the graphical user interface, the particular data set including a set of values associated with a set of identifiers;

receiving a selection of a transform scheme through the graphical user interface, the transform scheme configured to transform one or more values of the particular data set from a first form to a second form;

receiving selection of a first machine-learning algorithm and a second machine-learning algorithm through the graphical user interface, the first machine-learning algorithm configured to generate a first machine-learning model for the set of values and the second machine-learning algorithm configured to generate a second machine-learning model for the set of values;

in response to selection of the first machine-learning algorithm and the second machine-learning algorithm, determining a first iteration value for each given first parameter of two or more first parameters within the first machine-learning algorithm, and determining a second iteration value for each given second parameter of two or more second parameters within the second machine-learning algorithm;

iteratively executing the first machine-learning algorithm, using the two or more first parameters, according to a first iteration order and the first iteration value to process the set of values and generate a plurality of first machine-learning models;

iteratively executing the second machine-learning algorithm, using the two or more second parameters, according to a second iteration order and the second iteration value to process the set of values and generate a plurality of second machine-learning models;

determining one or more comparison metric values for data output by each of the plurality of first machine-learning models and the plurality of second machine-learning models; and causing presentation of the comparison metric values for the data output by the plurality of first machine-learning models and the plurality of second machine-learning models, the presentation comprising a selectable user interface element configured to cause the presentation of a result of at least one of a first machine learning model or a second machine learning model, the result comprising at least one of the comparison metric values.

12. The processor-readable storage device of claim 11, wherein the operations further comprise:

determining a first iteration order for the two or more first parameters within the first machine-learning algorithm and a second iteration order for the two or more second parameters within the second machine-learning algorithm.

13. The processor-readable storage device of claim 11, wherein iteratively modeling the set of values according to the first machine-learning algorithm further comprises:

generating a first set of machine-learning models for the set of values, each machine-learning model of the first set of machine-learning models corresponding to a different first iteration value of each first parameter of the two or more first parameters within the first machine-learning algorithm.

14. The processor-readable storage device of claim 11, wherein iteratively modeling the set of values according to the second machine-learning algorithm further comprises:

generating a second set of machine-learning models for the set of values, each machine-learning model of the second set of machine-learning models corresponding to a different second iteration value of each second parameter of the two or more second parameters within the second machine-learning algorithm.

* * * * *